US011989901B2

(12) United States Patent
Tsunashima et al.

(10) Patent No.: US 11,989,901 B2
(45) Date of Patent: May 21, 2024

(54) INFORMATION PROCESSING DEVICE AND INFORMATION PROCESSING METHOD

(71) Applicant: SONY CORPORATION, Tokyo (JP)

(72) Inventors: Nobuhiro Tsunashima, Tokyo (JP); Noribumi Shibayama, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 660 days.

(21) Appl. No.: 17/250,334

(22) PCT Filed: Jun. 4, 2019

(86) PCT No.: PCT/JP2019/022123
§ 371 (c)(1),
(2) Date: Jan. 6, 2021

(87) PCT Pub. No.: WO2020/017172
PCT Pub. Date: Jan. 23, 2020

(65) Prior Publication Data
US 2021/0142501 A1    May 13, 2021

(30) Foreign Application Priority Data

Jul. 17, 2018  (JP) .................................. 2018-134008

(51) Int. Cl.
*G06T 7/593*  (2017.01)
*G06T 7/246*  (2017.01)

(52) U.S. Cl.
CPC .............. *G06T 7/593* (2017.01); *G06T 7/246* (2017.01); *G06T 2207/10012* (2013.01); *G06T 2207/20081* (2013.01)

(58) Field of Classification Search
CPC ..................... G06T 7/593; G06T 7/246; G06T 2207/10012; G06T 2207/20081
(Continued)

(56) References Cited

U.S. PATENT DOCUMENTS

2012/0229628 A1\* 9/2012 Ishiyama ............. H04N 13/239
348/135
2015/0145963 A1  5/2015 Oshima et al.
(Continued)

FOREIGN PATENT DOCUMENTS

| CN | 109643437 A | 4/2019 |
| JP | 07-120255 A | 5/1995 |

(Continued)

OTHER PUBLICATIONS

International Search Report and Written Opinion of PCT Application No. PCT/JP2019/022123, dated Jul. 9, 2019, 10 pages of ISRWO.

*Primary Examiner* — Ali Bayat
(74) *Attorney, Agent, or Firm* — CHIP LAW GROUP

(57) ABSTRACT

An object detection processing section 21 detects an object region, using at least one of multiple viewpoint images (e.g., left-viewpoint image) with different viewpoint positions on the basis of information learned through prior learning. A distance measuring section 23 performs ellipse fitting on the object region detected by the object detection processing section 21 to set a distance measurement point arrangement region, and sets multiple distance measurement points in the distance measurement point arrangement region. The distance measuring section 22 performs a stereo matching process using the multiple viewpoint images to calculate a parallax with sub-pixel accuracy for each of the distance measurement points corresponding to the object indicated by an image of the object region and, on the basis of the calculated parallaxes, generates distance measurement information regarding the object. Thus, the distance measurement information regarding the object can be generated without elongating a baseline distance between imaging sections that acquire the multiple viewpoint images with different view- (Continued)

point positions to such an extent that the object can be distinguished from the background.

18 Claims, 14 Drawing Sheets

(58) Field of Classification Search
USPC .......................................................... 382/103
See application file for complete search history.

(56) References Cited

U.S. PATENT DOCUMENTS

| | | | |
|---|---|---|---|
| 2016/0309134 A1* | 10/2016 | Venkataraman | H04N 13/271 |
| 2016/0379374 A1* | 12/2016 | Sokeila | H04N 13/204 |
| | | | 348/43 |
| 2018/0197307 A1* | 7/2018 | Tomioka | G06V 20/10 |
| 2019/0080466 A1 | 3/2019 | Mori | |
| 2019/0368236 A1* | 12/2019 | Sakakura | G08G 1/16 |
| 2020/0175717 A1* | 6/2020 | Tomioka | G06V 20/10 |

FOREIGN PATENT DOCUMENTS

| | | |
|---|---|---|
| JP | 2014-009975 A | 1/2014 |
| JP | 2016-090831 A | 5/2016 |
| JP | 2016-103246 A | 6/2016 |
| WO | 2017/199696 A1 | 11/2017 |
| WO | 2018/037479 A1 | 3/2018 |

* cited by examiner

● : DISTANCE MEASUREMENT POINT

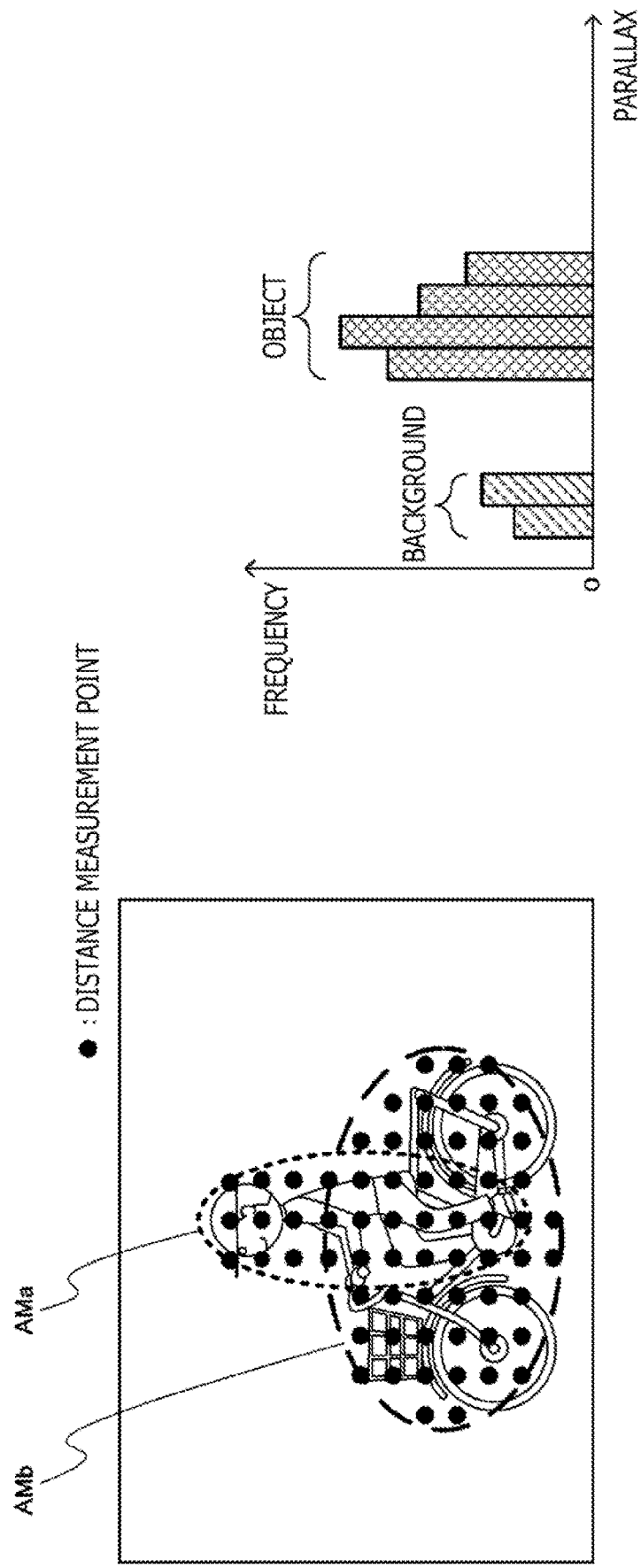

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2019/022123 filed on Jun. 4, 2019, which claims priority benefit of Japanese Patent Application No. JP 2018-134008 filed in the Japan Patent Office on Jul. 17, 2018. Each of the above-referenced applications is hereby incorporated herein by reference in its entirety.

TECHNICAL FIELD

The present technology relates to an information processing apparatus, an information processing method, and a program and aims to generate distance measurement information regarding an object even when the apparatus is small-sized.

BACKGROUND ART

In the past, techniques have been proposed that measure a distance to an object on the basis of captured images acquired by multiple imaging apparatuses with different viewpoints, the measured distance being used to avoid contact or collision between the object and a vehicle, for example. PTL 1, for instance, describes techniques for measuring a distance to an object by integrating a result of distance measurement in units of divided small regions of an image with a result of distance measurement on the same line.

CITATION LIST

Patent Literature

[PTL 1]
Japanese Patent Laid-Open No. 1995-120255

SUMMARY

Technical Problem

In a case where a distance is to be measured on the basis of captured images acquired by multiple imaging apparatuses with different viewpoints, an accuracy of the measured distance is made higher, the longer the distance between the viewpoints (baseline length). Also, in a case where an object region is identified inside an image by use of difference in distance between an object and a background, it is necessary to have a distance accuracy high enough for a sufficient difference in distance to exist between the object and the background. Accordingly, reduction in size of the apparatus becomes difficult.

In view of the above, the present technology aims to provide an information processing apparatus, an information processing method, and a program for generating distance information regarding an object even when the apparatus is small-sized.

Solution to Problem

According to a first aspect of the present technology, there is provided an information processing apparatus including an object detection processing section configured to detect an object region, using at least one of a plurality of viewpoint images with different viewpoint positions, and a distance measuring section configured to set a plurality of distance measurement points in the object region detected by the object detection processing section, and generate distance measurement information regarding an object indicated by an image of the object region on the basis of a parallax calculated for each of the plurality of distance measurement points using the plurality of viewpoint images.

According to the present technology, the object detection processing section detects the object region, using at least one of a plurality of viewpoint images with different viewpoint positions on the basis of information learned through prior learning. The distance measuring section sets a plurality of distance measurement points in the object region detected by the object detection processing section. For example, the distance measuring section performs ellipse fitting on the object region detected by the object detection processing section to set a distance measurement point arrangement region, and sets a plurality of distance measurement points in a predetermined distribution state in the distance measurement point arrangement region. Also, on the basis of a parallax calculated for each of the distance measurement points using the plurality of viewpoint images, the distance measuring section generates distance measurement information regarding the object indicated by the image of the object region. From a statistical distribution of the parallax calculated for each of the distance measurement points, the distance measuring section selects the distance measurement points corresponding to the object. For example, the distance measuring section turns into a histogram the parallax calculated for each of the distance measurement points, the distance measuring section further selecting, as the distance measurement points corresponding to the object, the distance measurement points indicating the parallax of a bin with the highest frequency or the parallax of bins in a predetermined range in reference to the highest-frequency bin. The distance measuring section generates the distance measurement information regarding the object on the basis of the parallax for each of the selected distance measurement points. For example, the distance measuring section performs a stereo matching process on each of the selected distance measurement points to obtain a matching error with pixel accuracy, calculates the parallax with sub-pixel accuracy on the basis of the pixel-accuracy matching error, and generates the distance measurement information using, as the parallax for the object, a statistical value such as a mean value based on the calculated parallax for each of the distance measurement points. Also, according to the object indicated by the image of the object region detected by the object detection processing section, the distance measuring section sets a search region for the stereo matching process, for example, and weights the matching error.

An object tracking section is further provided to track the object on the basis of the distance measurement information generated by the distance measuring section and the result of the object region detection performed by the object detection processing section. In a case where the object is tracked, the distance measuring section selects, from a statistical distribution of the parallax calculated for each of the distance measurement points, the parallaxes approximating those for the previously selected distance measurement points corresponding to the object, the distance measuring section further generating the distance measurement information regarding the object on the basis of the parallax for each of the selected distance measurement points. The object tracking section processes the distance measurement information used for tracking the object in keeping with a change over time in the distance measurement information. For example, in a case where a change in the distance measurement information is larger than a predetermined distance measurement information determination threshold value and where a difference between the distance measurement information involving the change larger than the distance measurement information determination threshold value and the distance measurement information subsequent thereto is equal to or smaller than the distance measurement information determination threshold value, the object tracking section tracks the object by invalidating the distance measurement information previous to the change larger than the distance measurement information determination threshold value. Also, in a case where a change in the distance measurement information is larger than a predetermined distance measurement information determination threshold value and where a difference between the distance measurement information subsequent to the change larger than the distance measurement information determination threshold value and the distance measurement information previous to the change larger than the distance measurement information determination threshold value is equal to or smaller than the distance measurement information determination threshold value, the object tracking section corrects the distance measurement information involving the change larger than the distance measurement information determination threshold value on the basis of the distance measurement information previous to the change larger than the distance measurement information determination threshold value or the distance measurement information subsequent to the change larger than the distance measurement information determination threshold value.

According to a second aspect of the present technology, there is provided an information processing method including causing an object detection processing section to detect an object region, using at least one of a plurality of viewpoint images with different viewpoint positions, and causing a distance measuring section to set a plurality of distance measurement points in the object region detected by the object detection processing section, the distance measuring section being further caused to generate distance measurement information regarding an object indicated by an image of the object region on the basis of a parallax calculated for each of the plurality of distance measurement points, using the plurality of viewpoint images.

According to a third aspect of the present technology, there is provided a program for causing a computer to execute information processing using a plurality of viewpoint images with different viewpoint positions, the program causing the computer to execute a procedure of detecting an object region using at least one of the plurality of viewpoint images, and a procedure of setting a plurality of distance measurement points in the detected object region, and generating distance measurement information regarding an object indicated by an image of the object region on the basis of a parallax calculated for each of the plurality of distance measurement points, using the plurality of viewpoint images.

Incidentally, the program of the present technology may be offered in a computer-readable format to, for example, a general-purpose computer capable of executing diverse program codes, using storage media or communication media, for example, the storage media such as optical discs, magnetic disks or semiconductor memories, or via the communication media such as networks. When provided with that program in a computer-readable manner, the computer performs the processes defined by the program.

Advantageous Effect of Invention

According to the present technology, the object region is detected by use of at least one of a plurality of viewpoint images with different viewpoint positions. In the detected object region, a plurality of distance measurement points is set. On the basis of the parallax calculated for each distance measurement point using the plurality of viewpoint images, distance measurement information is generated regarding the object indicated by the image of the object region. Thus, the distance measurement information regarding the object can be generated without increasing a baseline length to such an extent that the object and the background can be distinguished from each other, the baseline length being between the imaging sections for acquiring the plurality of viewpoint images with different viewpoint positions. Incidentally, it is to be noted that the advantageous effect stated in this specification is an example only and is not limitative of the present technology. There may be additional advantageous effects derived from this specification.

BRIEF DESCRIPTION OF DRAWINGS

FIGS. 6A and 6B depict views illustrating distance measurement points and a histogram of parallaxes for the distance measurement points.

FIGS. 9A and 9B depict views illustrating different histograms of parallaxes brought about by presence or absence of obstacles or the like.

DESCRIPTION OF EMBODIMENTS

Some preferred embodiments for implementing the present technology are described below. The description will be given under the following headings:

1. Measurement of Distance Using Multiple Viewpoint Images with Different Viewpoint Positions
2. First Embodiment
3. Second Embodiment
4. Third Embodiment
5. Other Embodiments
6. Application Examples

1. MEASUREMENT OF DISTANCE USING MULTIPLE VIEWPOINT IMAGES WITH DIFFERENT VIEWPOINT POSITIONS

Figure 1:
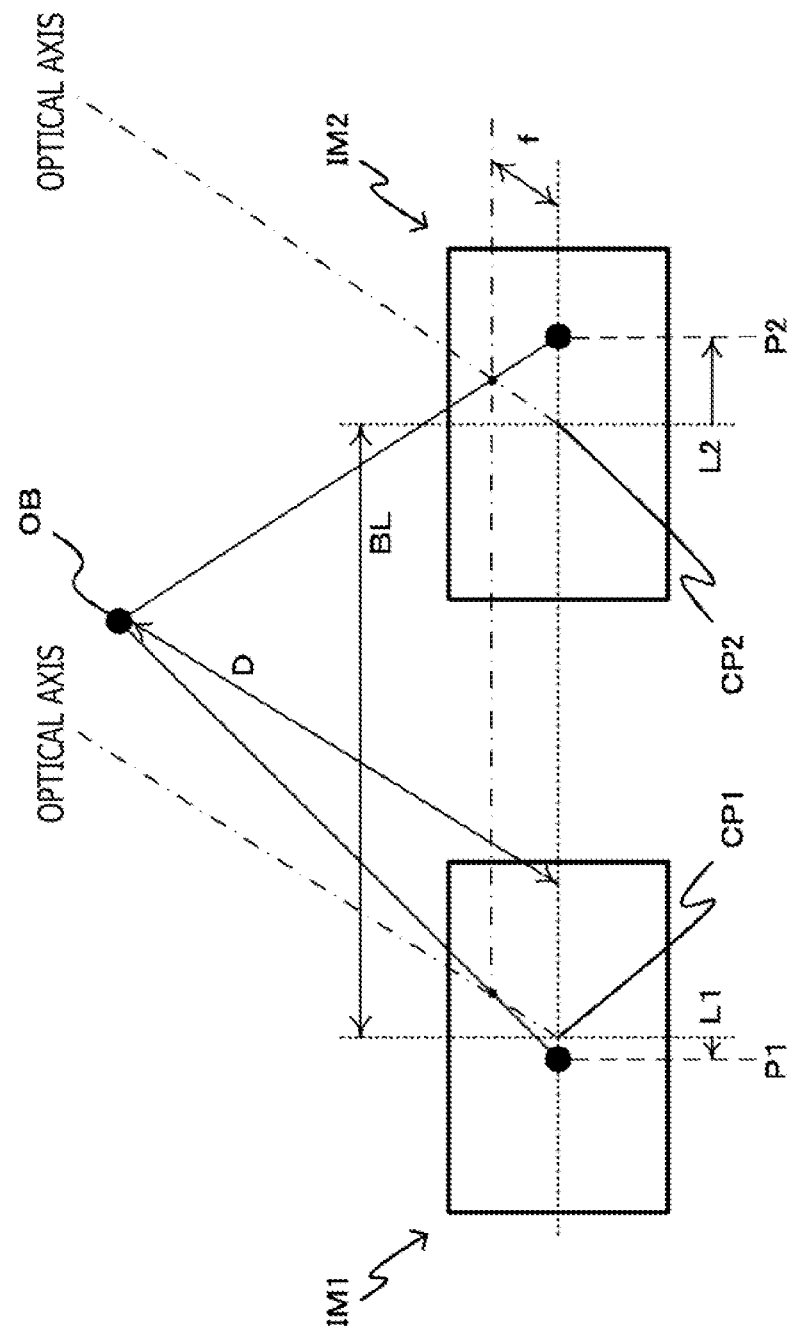
FIG. 1 is a view explaining a principle of distance measurement using multiple viewpoint images with different viewpoint positions.

FIG. 1 is a view explaining a principle of distance measurement using multiple viewpoint images with different viewpoint positions. Two imaging apparatuses which acquire multiple viewpoint images with different viewpoint positions such as stereo images are configured in such a manner that optical axes of lenses in the apparatuses are in parallel with each other. A distance between the optical axes in this configuration is referred to as the baseline length.

An object OB in the field of view of each imaging apparatus is projected onto a position P1 on an imaging plane IM1 of one imaging apparatus and onto a position P2 of an imaging plane IM2 of the other imaging apparatus, for example. Incidentally, it is assumed that a distance L1 ranges from a center CP1 of the imaging plane IM1 to the position P1 and that a distance L2 ranges from a center CP2 of the imaging plane IM2 to the position P2. The positions P1 and P2 vary depending on the distance to the object OB. A distance D from each imaging apparatus to the object OB is calculated by use of the following mathematical expression. Note that, in the expression (1), the term "BL" stands for the baseline length, "f" for the focal point distance of the imaging apparatus, and (L2−L2) for a parallax. The positions P1 and P2 are detected by a process known as stereo matching, for example.

$$D=(BL \cdot f)/(L2-L1) \qquad (1)$$

In stereo matching, a matching position is detected with sub-pixel accuracy. In a case where the matching position is to be detected with sub-pixel accuracy, using interpolation based on an evaluation value (matching error) with pixel accuracy detected by the stereo matching process detects the matching position with the sub-pixel accuracy.

Figure 2A:
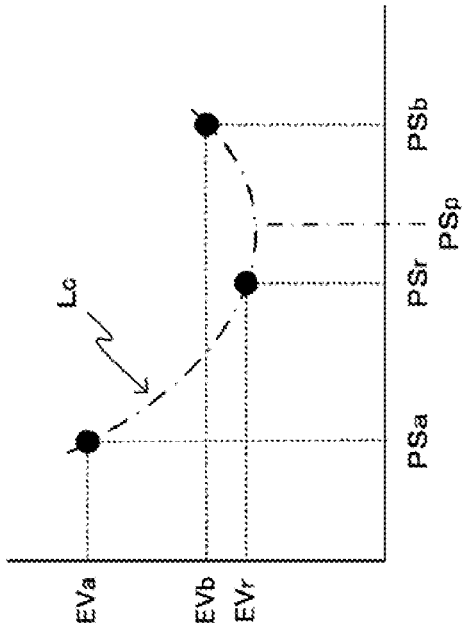
FIGS. 2A and 2B depict views explaining how a matching position is detected.
Figure 2B:
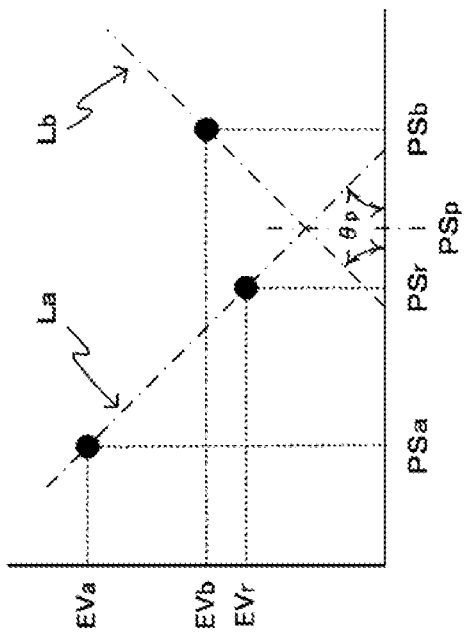

FIGS. 2A and 2B depict views explaining how a matching position is detected. Subfigure FIG. 2A indicates a case where isometric linear fitting is used, and Subfigure FIG. 2B indicates a case where parabolic fitting is utilized.

Isometric linear fitting involves using an evaluation value of a pixel position PSr having the highest evaluation value in terms of pixel accuracy detected by stereo matching and evaluation values of pixel positions PSa and PSb on both sides of the pixel position PSr. The evaluation value may be an absolute value sum of differences per pixel called SAD (Sum of Absolute Difference), for example. In isometric linear fitting, a straight line La connects an evaluation value EVr of the pixel position PSr with an evaluation value EVa of either the pixel position PSa or the pixel position PSb, whichever is lower in terms of evaluation value (pixel position PSa in the case of Subfigure FIG. 2A). Also, Isometric linear fitting further involves calculating a straight line Lb that passes through an evaluation value EVb of the pixel position with the higher evaluation value (pixel position PSb in the case of Subfigure FIG. 2A), the line Lb having an inverted sign of inclination of the straight line La at an inclination of θp. A pixel position PSp at the point of intersection between the straight lines La and Lb is used as the matching position with sub-pixel accuracy.

Parabolic fitting involves using an evaluation value of a pixel position PSr having the highest evaluation value in terms of pixel accuracy detected by stereo matching and evaluation values of pixel positions PSa and PSb on both sides of the pixel position PSr. The evaluation value may be the sum of squared differences per pixel called SSD (Sum of Squared Difference), for example. Parabolic fitting further involves calculating a quadratic curve Lc passing through evaluation values EVa, EVr and EVb of the pixel positions PSa, PSr, and PSb. A pixel position PSp which represents the extreme value of the quadratic curve Lc indicating changes in evaluation value is used as the matching position with sub-pixel accuracy. Incidentally, the evaluation value is not limited to SAD or to SSD. Alternatively, Normalized Cross-Correlation (NCC), Zero-mean Normalized Cross-Correlation (ZNCC), or the like may be utilized as the evaluation value.

2. FIRST EMBODIMENT

Figure 3:
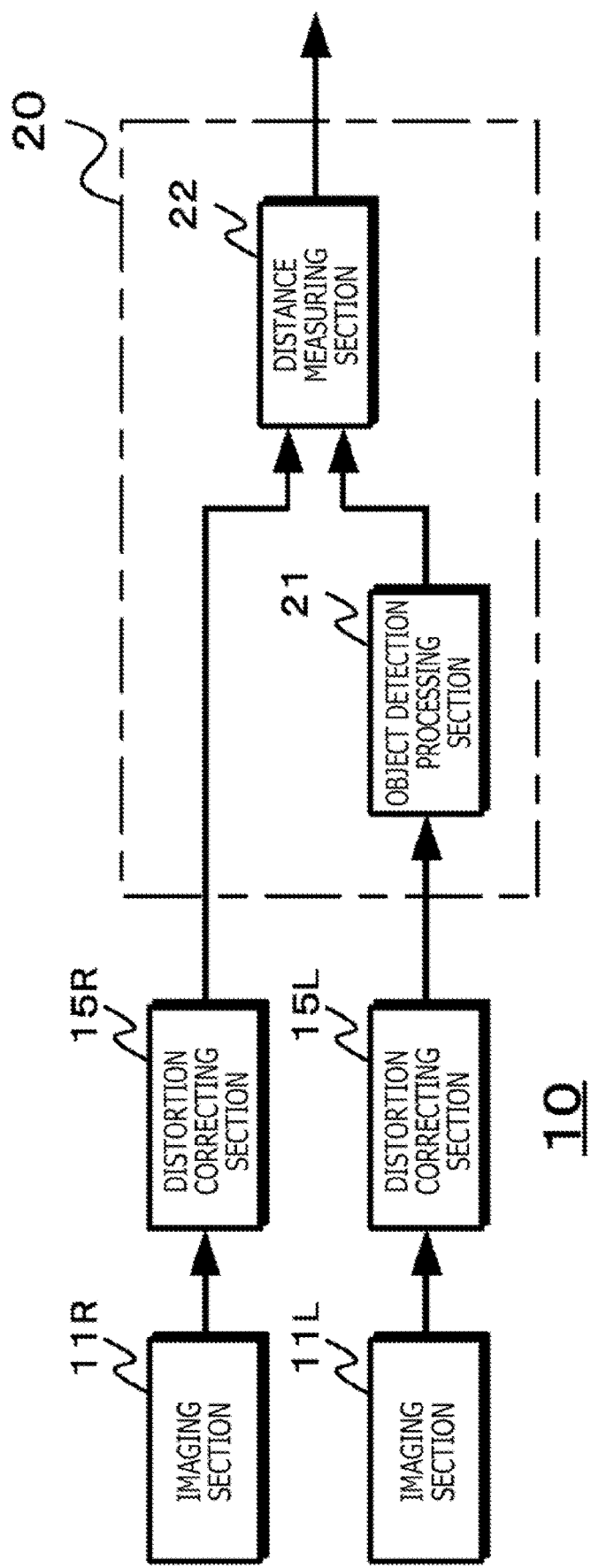
FIG. 3 is a view illustrating a configuration of a first embodiment of an information processing apparatus.

FIG. 3 illustrates a configuration of a first embodiment of an information processing apparatus. In an information processing system 10, an information processing apparatus 20 generates distance information regarding an object, using a left-viewpoint image acquired by an imaging section 11L and a right-viewpoint image acquired by an imaging section 11R, for example. The information processing system 10 may include distortion correcting sections 15L and 15R.

The two imaging sections 11L and 11R for stereo image acquisition are arranged in such a manner that optical axes of their lenses are in parallel with each other. The left-viewpoint image acquired by the imaging sections 11L is output to the distortion correcting section 15L, and the right-viewpoint image acquired by the imaging section 11R is output to the distortion correcting section 15R.

The distortion correcting section 15L corrects distortion of the left-viewpoint image caused by a distortion aberration of the lens used in the imaging section 11L, or the like. The distortion correcting section 15L acquires an amount of displacement of each of the pixels on the basis of a distortion correction table stored beforehand, for example, and corrects the distortion by moving the pixel by the acquired amount of displacement. The distortion correcting section 15L outputs the distortion-corrected left-viewpoint image to the information processing apparatus 20.

The distortion correcting section 15R corrects distortion of the right-viewpoint image caused by a distortion aberration of the lens used in the imaging section 11R, or the like. The distortion correcting section 15R corrects the distortion of the right-viewpoint image in a manner similar to that of the distortion correcting section 15L. The distortion correcting section 15R outputs the distortion-corrected right-viewpoint image to the information processing apparatus 20.

Incidentally, distortion correction is not limited to the method of using the distortion correction table and may be implemented by other known methods. Also, in a case where there is little distortion of the left-viewpoint and right-viewpoint images acquired by the respective imaging sections 11L and 11R, the distortion correcting sections 15L and 15R may be omitted.

The information processing apparatus 20 includes an object detection processing section 21 and a distance measuring section 22. The object detection processing section 21 detects an image region of the object using at least one of multiple viewpoint images with different viewpoint positions. For example, the information processing apparatus 20 depicted in FIG. 3 performs an object detecting process for detecting the object image region by use of the left-viewpoint image that has been distortion-corrected by the distortion correcting section 15L.

The object detecting process involves detecting an object region in an image through learning. The learning in this case is deep learning, for example. The algorithm of object detection through deep learning may be SSD (Single Shot Multi Box Detector). Alternatively, the algorithm may be YOLO (You Only Look Once), R-CNN (Regions with CNN features), or the like. As long as algorithm is capable of object detection at high speed with high accuracy, the algorithm is not limited to those described above, and any algorithm other than those may be utilized. The object detection processing section 21 outputs the distortion-corrected left-viewpoint image and the result of object region detection to the distance measuring section 22. Note that, although the example in FIG. 3 uses the distortion-corrected left-viewpoint image for object detection, a distortion-corrected right-viewpoint image may be used instead for object detection. Also, in a case where the distortion correcting sections 15L and 15R are not provided, object detection may be performed by use of either the left-viewpoint image acquired by the imaging section 11L or the right-viewpoint image acquired by the imaging section 11R.

The distance measuring section 22 sets multiple distance measurement points in the object image region detected by the object detection processing section 21 and, on the basis of a parallax calculated for each distance measurement point, generates distance measurement information regarding the object. For example, the distance measuring section 22 performs the above-described stereo matching process on the object region detected by the object detection processing section 21, to detect the parallax with sub-pixel accuracy. The distance measuring section 22 calculates a distance on the basis of the detected parallax or of the detected parallax, the baseline length between the imaging sections, and the focal point distance thereof, the calculated distance being used as the distance information regarding the object (subject) indicated by the object region image.

The distance information may be generated for each individually detected object region or for an integrated object region obtained by integrating the individually detected object regions. With either a single object region or the integrated object region used as a distance measurement point arrangement region, the distance information may be generated on the basis of the parallaxes detected for multiple distance measurement points provided in the distance measurement point arrangement region. Also, in a case where a non-rectangular object is detected and the object region is set to be rectangular, there would be too many distance measurement points representing the background if the object region is used as the distance measurement point arrangement region. Thus, the distance measuring section 22 performs ellipse fitting on the object region detected by the object detection processing section 21 to set the distance measurement point arrangement region, and sets multiple distance measurement points in a predetermined distribution state, for example, in the distance measurement point arrangement region.

Figure 4B:
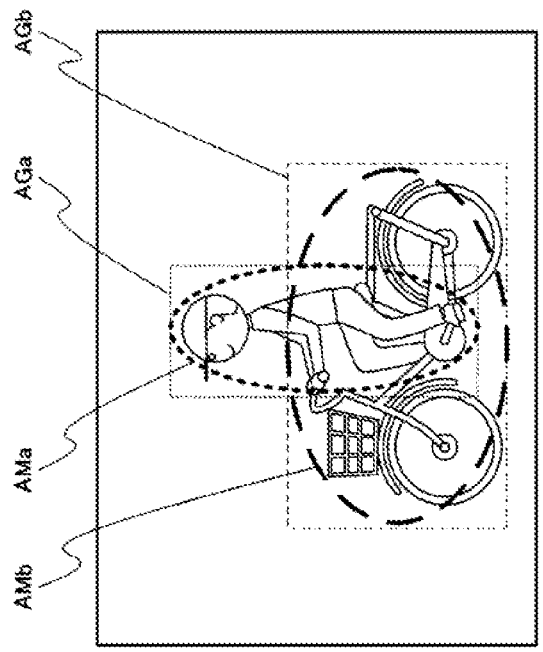
FIGS. 4A and 4B depict views illustrating a result of object detection and distance measurement point arrangement regions.
Figure 4A:
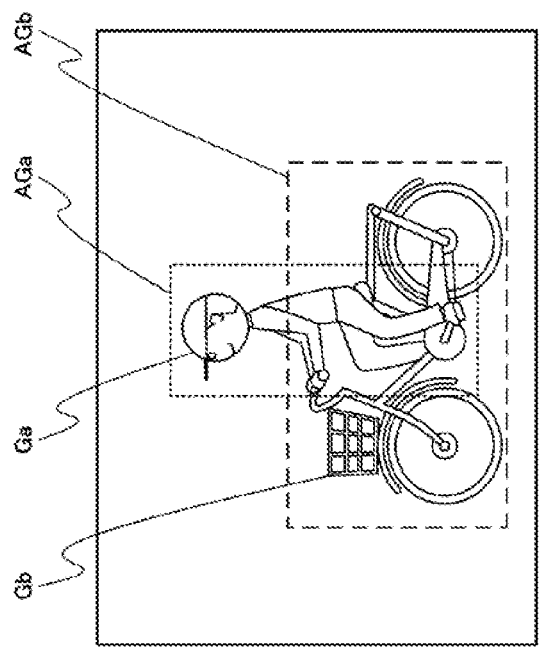

FIGS. 4A and 4B illustrate a result of object detection and distance measurement point arrangement regions. Subfigure FIG. 4A depicts the object detection result. The object detection processing section 21 detects a person Ga and a bicycle Gb. As a result of the object region detection, there are provided an object region AGa corresponding to the person Ga and an object region AGb corresponding to the bicycle Gb. Subfigure FIG. 4B depicts distance measurement point arrangement regions. The distance measuring section 22 performs ellipse fitting on the object region AGa to set a distance measurement point arrangement region AMa, while performing ellipse fitting on the object region AGb to set a distance measurement point arrangement region AMb representing an ellipse region internally tangent to the object region.

Figure 5A:
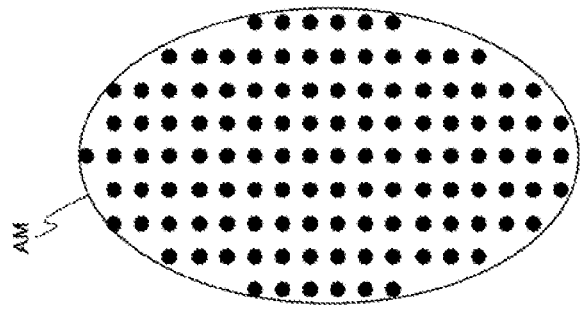
FIGS. 5A, 5B, and 5C depict views illustrating distance measurement point arrangements inside the distance measurement point arrangement region.
Figure 5B:
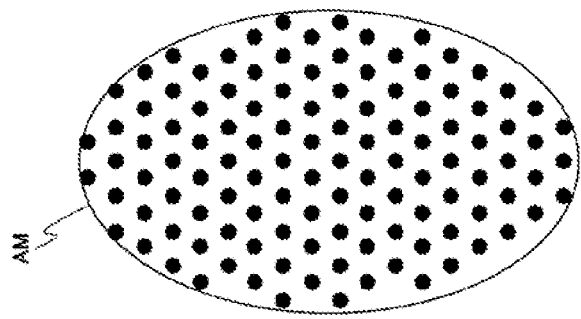
Figure 5C:
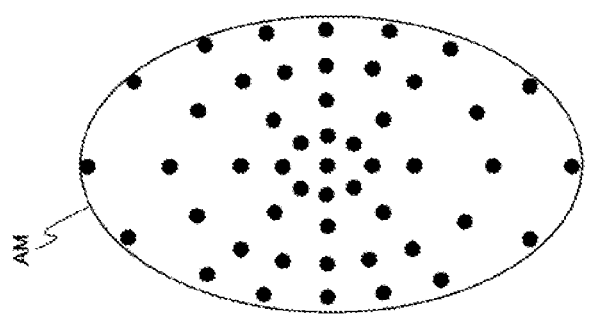

FIGS. 5A, 5B, and 5C illustrate distance measurement point arrangements within the distance measurement point arrangement region. Subfigure FIG. 5A illustrates a case in which the distance measurement points are arranged in square grid distribution. Subfigure FIG. 5B illustrates a case in which the distance measurement points are arranged in equilateral triangle grid distribution. Alternatively, as illustrated in Subfigure FIG. 5C, regarding the distance measurement points, the distance measurement points may be arranged in distribution radially from the center of the distance measurement point arrangement region, the points being more concentrated, the closer they are to the center. As another alternative, the distance measurement points may be arranged randomly. As a further alternative, in order to facilitate the stereo matching process, image feature points in the distance measurement point arrangement region may be utilized, for example, with multiple image feature points at a central part of the region used as the distance measurement points in a manner eliminating the image feature points indicating the boundary between the object and the background.

The distance measuring section 22 calculates the parallax of the object from a statistical distribution of the parallax calculated for each of the distance measurement points. On the basis of a statistical distribution of the parallaxes, the distance measuring section 22 detects parallax candidates and calculates a highly accurate parallax through interpolation based on changes in matching error near the parallax candidates.

The distance measuring section 22 calculates the parallax with pixel accuracy for each distance measurement point through the stereo matching process. Also, the distance measuring section 22 performs a filter process on the calculated parallaxes to eliminate outliers indicating background portions or matching errors. The distance measuring section 22 statistically processes the parallax for each of the distance measurement points to generate a histogram indicating the frequency of each parallax, for example. The distance measuring section 22 then eliminates the outliers by selecting only a peak bin in the histogram or only the bins in a predetermined range in reference to the peak bin. FIGS. 6A and 6B illustrate distance measurement points and a histogram of the parallax for each of the distance measurement points. Subfigure FIG. 6A illustrates distance measurement points set in the distance measurement point arrangement regions AMa and AMb. Subfigure FIG. 6B illustrates a histogram of the parallax calculated for each of the distance measurement points. The distance measuring section 22 selects the distance measurement points corresponding to the parallaxes indicated by cross hatching and eliminates the distance measurement points corresponding to the parallaxes hatched with oblique lines.

Given the distance measurement points corresponding to the parallaxes indicated by cross hatching in Subfigure FIG. 6B, the distance measuring section 22 calculates their parallaxes with sub-pixel accuracy through interpolation based on evaluation values and calculates a statistical value based on the calculated sub-pixel accuracy parallaxes as the parallax for the object. For example, the distance measuring section 22 sorts the calculated sub-pixel accuracy parallaxes in order of size and uses a median value parallax as the parallax for the object. In this manner, with the median value used as the parallax for the object, the impact of error that may occur when any of the sub-pixel accuracy parallaxes for the selected distance measurement points is not correctly calculated, for example, can be made smaller than a case in which the mean value of the parallaxes is used as the parallax regarding the object. The distance measuring section 22 generates distance information indicating the distance calculated on the basis of the calculated sub-pixel accuracy parallax or of the sub-pixel accuracy parallax, focal point distance f, and baseline length BL and outputs the generated distance information.

Figure 7:
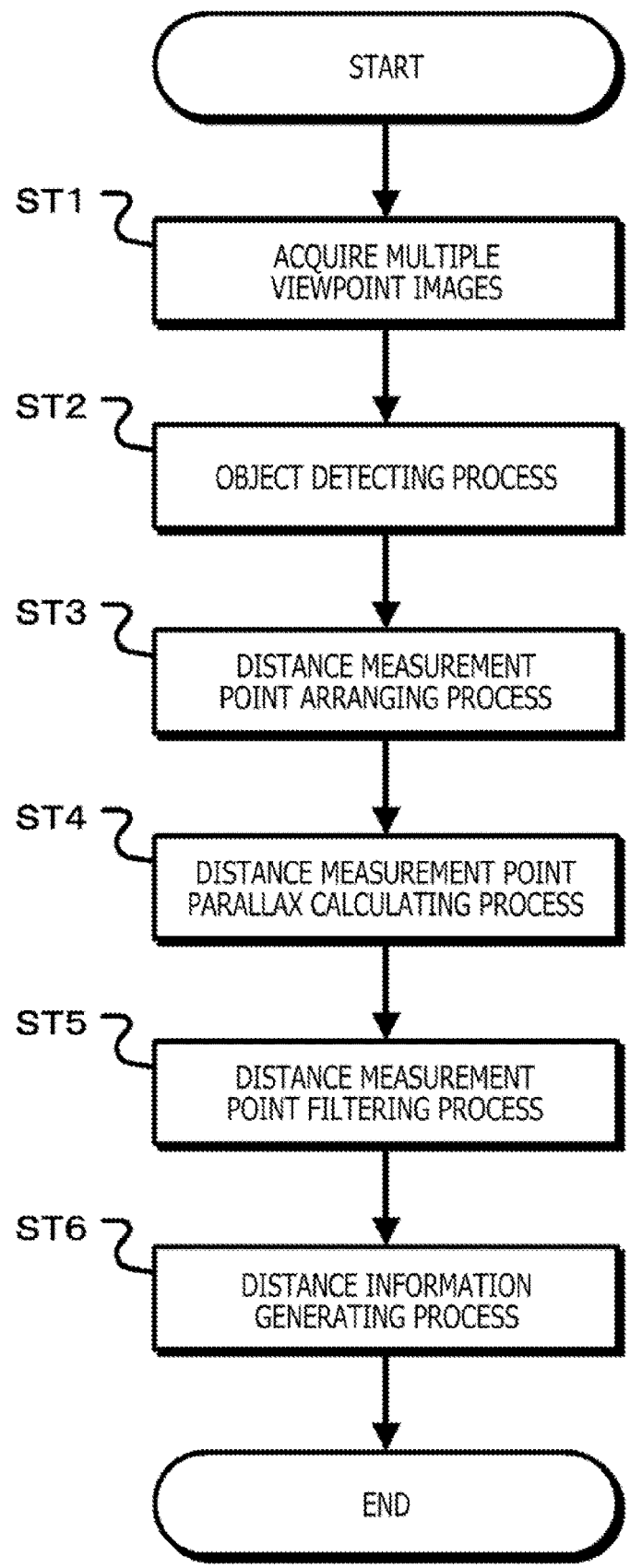
FIG. 7 is a flowchart illustrating operations of the first embodiment.

FIG. 7 is a flowchart illustrating operations of the first embodiment. In step ST1, the information processing apparatus acquires multiple viewpoint images. For example, the information processing apparatus 20 acquires a left-viewpoint image and a right-viewpoint image and goes to step ST2.

In step ST2, the information processing apparatus performs an object detecting process. The information processing apparatus 20 carries out the object detecting process using at least one of the left-viewpoint or right-viewpoint image and goes to step ST3.

In step ST3, the information processing apparatus performs a distance measurement point arranging process. On the basis of the object region detected in step ST2, the information processing apparatus sets, for example, an ellipse region internally tangent to the object region as the distance measurement point arrangement region. The information processing apparatus further sets multiple distance measurement points in the distance measurement point arrangement region and goes to step ST4.

In step ST4, the information processing apparatus performs a distance measurement point parallax calculating process. The information processing apparatus performs the stereo matching process on each of the distance measurement points set in step ST3 to calculate their parallaxes and goes to step ST5.

In step ST5, the information processing apparatus performs a distance measurement point filtering process. The information processing apparatus statistically processes the parallax for each of the distance measurement points to obtain a histogram indicating a parallax distribution, for example, the frequency of each of the parallaxes. On the basis of the histogram, the information processing apparatus eliminates the distance measurement points indicating background portions or matching errors. Further, the information processing apparatus selects the distance measurement points corresponding to the parallax with the highest frequency and to the parallaxes nearby and goes to step ST6.

In step ST6, the information processing apparatus performs a distance information generating process. Given the distance measurement points selected by the filtering process, the information processing apparatus calculates parallaxes with sub-pixel accuracy through interpolation based on evaluation values. Furthermore, on the basis of the calculated sub-pixel accuracy parallaxes, the information processing apparatus calculates the parallax for the object. The distance measuring section 22 generates distance information indicating the distance D to the object calculated on the basis of the parallax for the object or of the parallax regarding the object, the focal point distance f of the imaging sections 11L and 11R, and the baseline length BL therebetween.

According to the first embodiment, as described above, the distance measurement information regarding the object can be generated without a need to increase the baseline length between the imaging sections that acquire multiple viewpoint images with different viewpoint positions in such a manner as to be able to distinguish the object from the background. Thus, it is possible to reduce the size of the information processing system.

3. SECOND EMBODIMENT

Explained next is a second embodiment of the information processing apparatus. In the second embodiment, the detected object is tracked to obtain the trajectory thereof. Specifically, it is determined whether the same object is included in chronologically continuous images so as to acquire the positions of the same object, so that the trajectory of the object is obtained.

Figure 8:
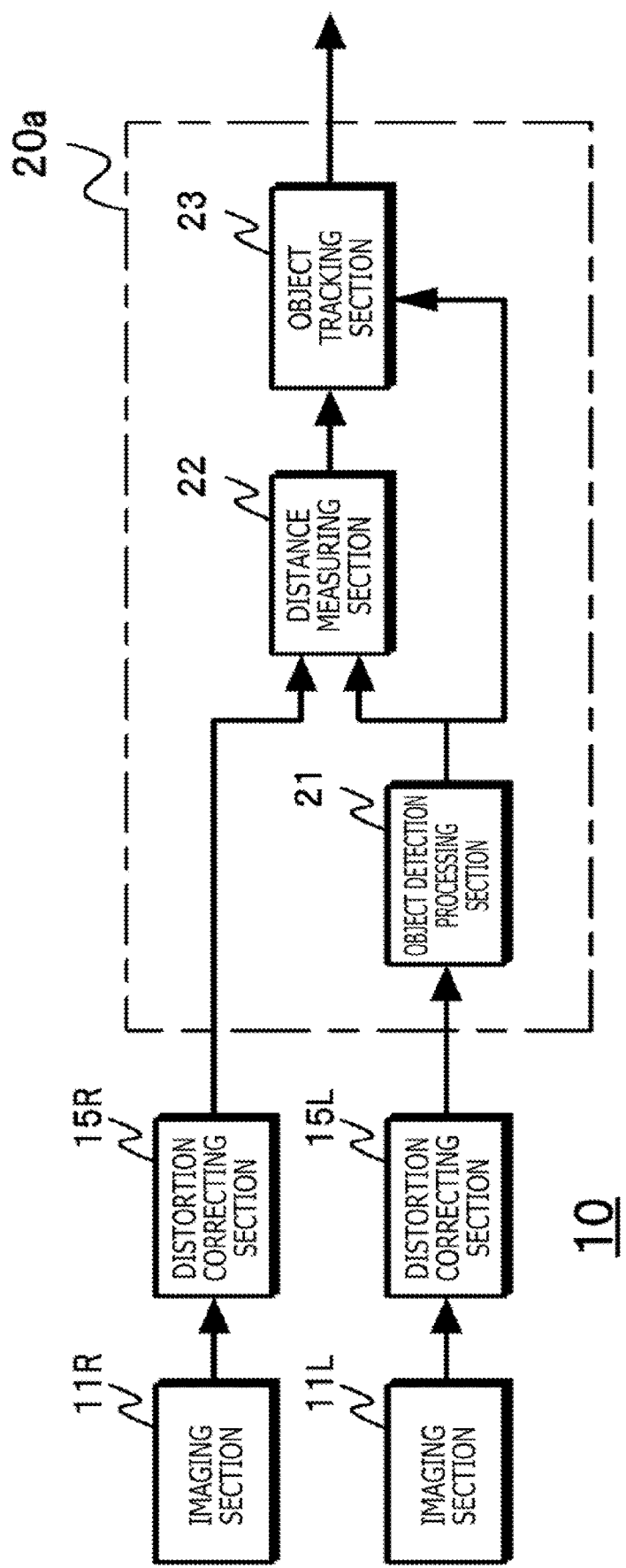
FIG. 8 is a view illustrating a configuration of a second embodiment.

FIG. 8 illustrates a configuration of the second embodiment. In the information processing system 10, the information processing apparatus is different in configuration from the first embodiment. The information processing apparatus generates distance information regarding the object using a left-viewpoint image acquired by the imaging section 11L and a right-viewpoint image acquired by the imaging section 11R. The information processing apparatus further tracks the object, using the distance information.

The two imaging sections 11L and 11R for stereo image acquisition are arranged in such a manner that the optical axes of their lenses are in parallel with each other. The left-viewpoint image acquired by the imaging section 11L is output to the distortion correcting section 15L, and the right-viewpoint image acquired by the imaging section 11R is output to the distortion correcting section 15R.

The distortion correcting section 15L corrects the distortion of the left-viewpoint image caused by a distortion aberration of the lens used in the imaging section 11L, or the like and outputs the left-viewpoint image to the information processing apparatus 20. The distortion correcting section 15R corrects the distortion of the right-viewpoint image caused by a distortion aberration of the lens used in the imaging section 11R, or the like and outputs the right-viewpoint image to the information processing apparatus 20a.

The information processing apparatus 20a includes the object detection processing section 21, the distance measuring section 22, and an object tracking section 23. As in the first embodiment, the object detection processing section 21 detects the object region using at least one of multiple viewpoint images with different viewpoint positions. The object detection processing section 21 outputs the result of object detection to the distance measuring section 22 and to the object tracking section 23.

The distance measuring section 22 performs processing such as the stereo matching process on the object region detected by the object detection processing section 21, generates distance information indicating the distance to the object on the basis of the sub-pixel accuracy parallax for the object or of the parallax for the object, the baseline length between the imaging sections 11L and 11R, and the focal point distance thereof, and outputs the generated distance information to the object tracking section 23.

The object tracking section 23 tracks the object on the basis of the distance measurement information generated by the distance measuring section 22 and of the result of object region detection by the object detection processing section 21.

The object tracking section 23 determines whether the object is the same, using similarity in the size, position, and distance information regarding the object. For example, it is assumed that "St" stands for the size of the object at time t, "Qxt, Qyt" for the position of the object at time t, and "VPt" for the distance information regarding the object (e.g., parallax) at time t. Further, it is assumed that "St−1" stands for the size of the object at time t−1, "Qxt−1, Qyt−1" for the position of the object at time t−1, and "VPt−1" for the distance information regarding the object at time t−1. On the basis of the mathematical expression (2) below, the object tracking section 23 calculates an evaluation value EWt at time t. In a case where the evaluation value EWt is smaller than a determination threshold value Th, the object tracking section 23 determines that the object at time t is the same as the object at time t−1. Also, the object tracking section 23 obtains, as the trajectory of the object, a path connecting the positions at the times at which the object is determined to be the same. Note that, in the following mathematical expression (2), values α, β, and γ are predetermined coefficients:

$$EWt = \alpha(St-1-St)^2 + \beta((Qxt-1-Qxt)^2 + (Qyt-1-Qyt)^2) + \gamma(VPt-1-VPt)^2 \quad (2)$$

Also, in a case where the object is tracked, the distance measuring section 22 selects the parallaxes approximating those for the previously selected distance measurement points corresponding to the object from a statistical distribution of the parallax calculated for each of the distance measurement points and, on the basis of the selected parallax for each of the distance measurement points, generates distance measurement information regarding the object.

Figure 9:
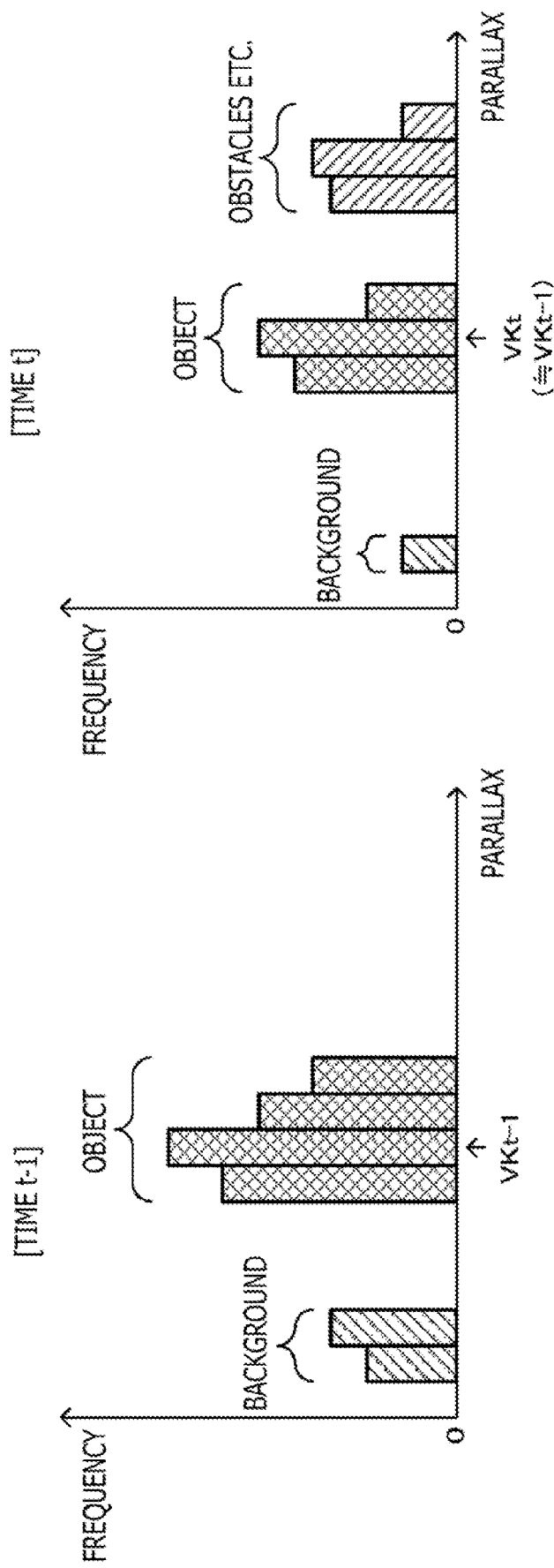

FIGS. 9A and 9B illustrate different histograms of parallaxes brought about by presence or absence of obstacles or the like. Subfigure FIG. 9A illustrates a case in which there is no obstacle or the like at time t−1, and Subfigure FIG. 9B illustrates a case in which the object is partially hidden by obstacles or the like at time t. In Subfigure FIG. 9B, the obstacles or the like between the imaging sections and the object cause the frequencies of the parallaxes corresponding to the background and to the object to decrease and the frequencies of the parallaxes corresponding to the obstacles or the like to increase. In such a case, the distance measuring section 22 detects a peak in the histogram of the parallaxes, for example, and selects, as the distance measurement point corresponding to the object, the distance measurement point indicating the parallax of a bin VKt indicating a peak closest to a bin VKt−1 of the previous parallax peak or the distance measurement points indicating bins in a predetermined range in reference to the bin VKt. The distance measuring section 22 calculates a parallax VPt for the object at time t on the basis of the parallax for the selected distance measurement point.

As described above, the parallaxes approximating those of the previously selected distance measurement points corresponding to the object are selected from the statistical distribution of the parallax calculated for each of the distance measurement points. On the basis of the selected parallax for each of the distance measurement points, the distance measurement information regarding the object is generated. This makes it possible to prevent incorrect calculation of the evaluation value EW by using the parallaxes for obstacles or the like even if the object is partially hidden by the obstacles or the like interposed between the object and the imaging sections, for example. Thus, the object tracking section 23 is allowed to track the object correctly.

Figure 10:
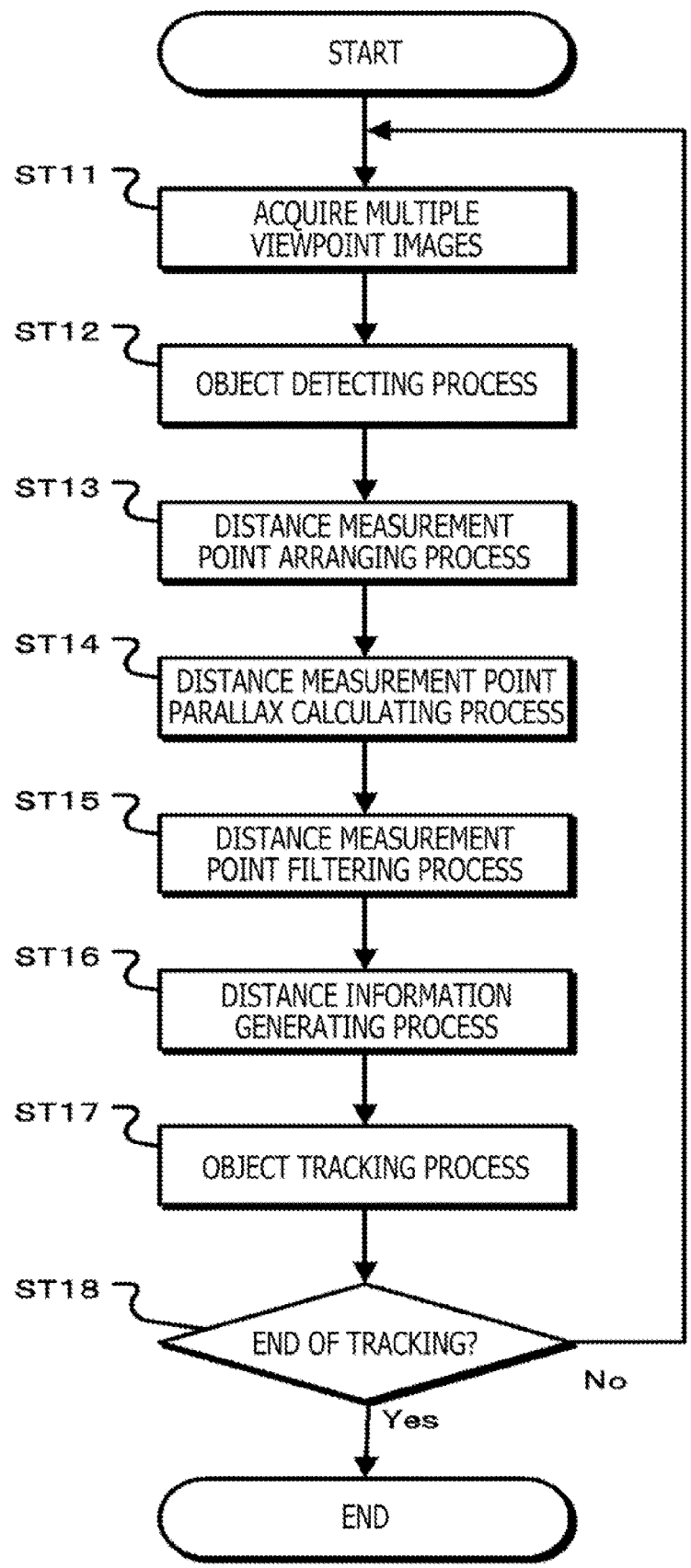
FIG. 10 is a flowchart illustrating operations of the second embodiment.

FIG. 10 is a flowchart illustrating operations of the second embodiment. In step ST11, the information processing apparatus acquires multiple viewpoint images. For example, the information processing apparatus 20 acquires a left-viewpoint image and a right-viewpoint image and goes to step ST12.

In step ST12, the information processing apparatus performs an object detecting process. The information processing apparatus 20 performs the object detecting process, using at least one of the left-viewpoint image or right-viewpoint image and goes to step ST13.

In step ST13, the information processing apparatus performs a distance measurement point arranging process. On the basis of the object region detected in step ST12, the information processing apparatus sets, for example, an ellipse region internally tangent to the object region as the distance measurement point arrangement region. The information processing apparatus further sets multiple distance measurement points in the distance measurement point arrangement region and goes to step ST14.

In step ST14, the information processing apparatus performs a distance measurement point parallax calculating process. The information processing apparatus performs the stereo matching process on each of the distance measurement points set in step ST13 to calculate their parallaxes and goes to step ST15.

In step ST15, the information processing apparatus performs a distance measurement point filtering process. The information processing apparatus statistically processes the parallax for each of the distance measurement points to obtain a histogram indicating a parallax distribution, for example, the frequency of each of the parallaxes. On the basis of the histogram, the information processing apparatus eliminates the distance measurement points indicating background portions or matching errors. Also, the information processing apparatus selects the distance measurement points corresponding to the parallax with the highest frequency and to the parallaxes nearby and goes to step ST16.

In step ST16, the information processing apparatus performs a distance information generating process. Given the distance measurement points selected by the filtering process, the information processing apparatus calculates the parallax for the object with sub-pixel accuracy through interpolation based on evaluation values. Also, the distance measuring section 22 generates distance information indicating the distance D to the object calculated on the basis of the parallax for the object or of the parallax regarding the object, focal point distance f of the imaging sections 11L and 11R, and baseline length BL therebetween. The information processing apparatus outputs the generated distance information and goes to step ST17.

In step ST17, the information processing apparatus performs an object tracking process. The information processing apparatus calculates an evaluation value EW on the basis of the sizes and positions of the object detected by the object detection processing section 21 and the distance information generated by the distance information generating process. In a case where the evaluation value EW is smaller than a determination threshold value Th, the information processing apparatus determines that the object is the same and tracks the object, outputs the result of the tracking and goes to step ST18.

In step ST18, the information processing apparatus determines whether the tracking is terminated. In a case where there is no instruction to terminate the tracking, the information processing apparatus returns to step ST11. In a case where an instruction is given to terminate the tracking, the information processing apparatus brings the operations to an end.

According to the second embodiment as described above, whether the object is the same is determined on the basis of the evaluation value calculated according to the result of object detection by the object detection processing section 21 and the distance information generated by the distance measuring section 22. This makes it possible to track the object with high accuracy on the basis of the result of the determination.

4. THIRD EMBODIMENT

Explained next is a third embodiment of the information processing apparatus. In the third embodiment, the distance measurement information used for tracking the object in keeping with a change over time in the distance measurement information is processed. This allows the third embodiment to track the object more stably than the second embodiment.

The information processing apparatus 20 is configured in a manner similar to the second embodiment. What differentiates the information processing apparatus 20 from the second embodiment is the operation of the object tracking section 23. Note that, in the description that follows, the distance information generated by the distance measuring section 22 indicates the distance to the object. Alternatively, the distance measurement information may represent parallaxes.

If the peak in the histogram of parallaxes is not evident, the distance indicated by the distance measurement information generated by the distance measuring section 22 may cause an error. Thus, the object tracking section 23 detects the change over time in the distance to the object and, in a case where the detected change in the distance is larger than a distance measurement information determination threshold value, invalidates the distance previous to the distance involving the time change larger than the distance measurement information determination threshold value so as not to calculate the evaluation value EW thereby.

Further, in a case where the change in the distance is larger than a predetermined distance measurement information determination threshold value and where a difference between the distance involving the change larger than the distance measurement information determination threshold value and the distance subsequent to the distance involving the change larger than the distance measurement information determination threshold value is equal to or smaller than the distance measurement information determination threshold value, the object tracking section 23 may track the object by invalidating the distance previous to the distance involving the change larger than the distance measurement information determination threshold value. Also, in a case where the change in the distance is larger than the distance measurement information determination threshold value and where a difference between the distance subsequent to the distance involving the change larger than the distance measurement information determination threshold value and the distance previous to the distance involving the change larger than the distance measurement information determination threshold value is equal to or smaller than the distance measurement information determination threshold value, the object tracking section 23 corrects the distance involving the change larger than the distance measurement information determination threshold value on the basis of the distance previous to the distance involving the change larger than the distance measurement information determination threshold value or the distance subsequent to the distance involving the change larger than the distance measurement information determination threshold value.

Figure 11B:
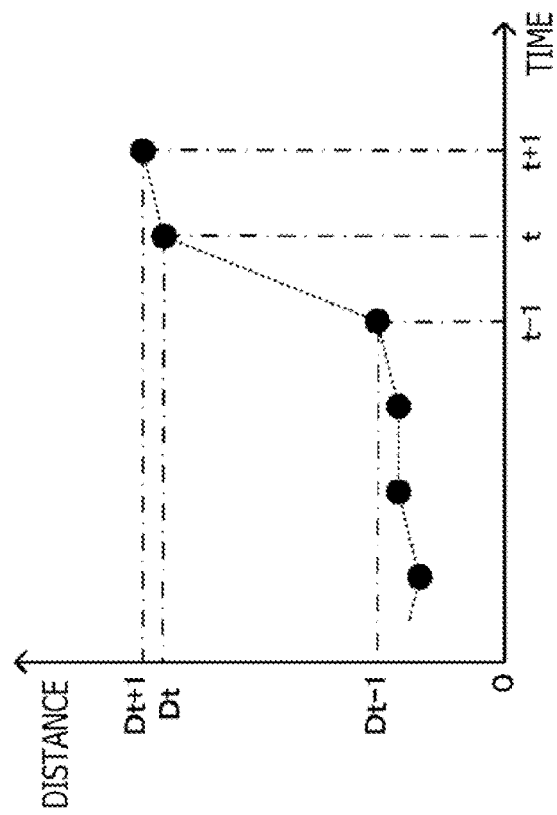
FIGS. 11A and 11B depict views illustrating relations between time and distances indicated by distance information.
Figure 11A:
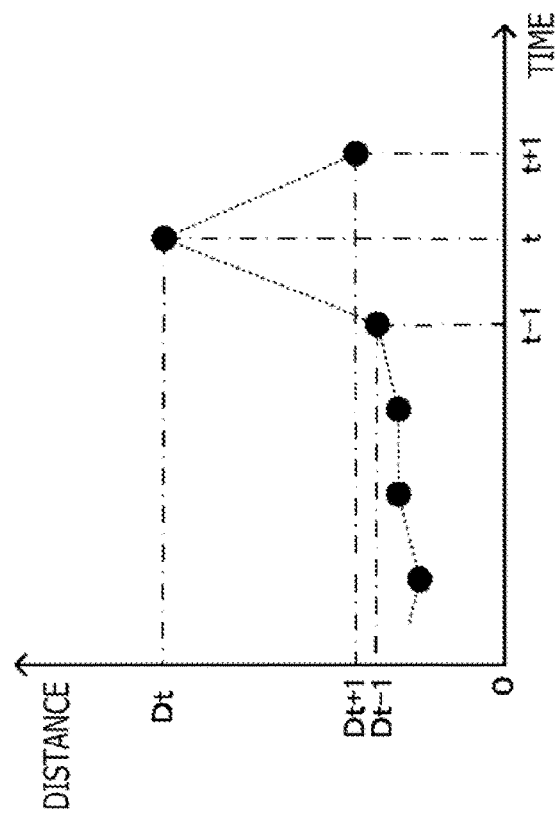

FIGS. 11A and 11B illustrate relations between time and distances indicated by distance information. In Subfigures FIGS. 11A and 11B, there is little change in distance until time t−1, whereas a large change in distance occurs at time t. Subfigure FIG. 11A depicts a case where there is little change in distance at time t+1 relative to time t, and Subfigure FIG. 11B depicts a case where there is a large change in distance at time t+1 with respect to time t.

In a case where a difference in distance between a distance $Dt-1$ to the object at time t−1 and a distance $Dt$ to the object at time t is equal to or smaller than a distance measurement information determination threshold value, the object tracking section 23 uses the result of object detection and the distance information as the result of the tracking. Also, in a case where a difference in distance between the distance $Dt-1$ to the object at time t−1 and the distance $Dt$ to the object at time t is larger than the distance measurement information determination threshold value, the object tracking section 23 calculates a difference in distance between a distance $Dt+1$ to the object at a later time t+1 and the distance $Dt$ to the object at time t at which a large change in distance has occurred.

As depicted in Subfigure FIG. 11A, in a case where there is little change in distance at time t+1 relative to time t and where a difference in distance between the distance $Dt$ to the object at time t and the distance $Dt+1$ to the object at time t+1 is equal to or smaller than the distance measurement information determination threshold value, the object tracking section 23 invalidates the distance up to time t−1 by determining that the result of distance measurement up to time t−1 causes an error or that the object before time t−1 is different from the object at time t and subsequent thereto because of a failure in tracking the object.

As illustrated in Subfigure FIG. 11B, in a case where a difference in distance between the distance $Dt$ to the object at time t and the distance $Dt+1$ to the object at time t+1 is larger than the distance measurement information determination threshold value, the object tracking section 23 calculates a difference in distance between the distance $Dt-1$ to the object at time t−1 and the distance $Dt+1$ to the object at time t+1. In a case where the calculated difference in distance is equal to or smaller than the distance measurement information determination threshold value, the object tracking section 23 determines that the distance $Dt$ to the object at time t is erroneous and invalidates the distance $Dt$. Also, after determining that the distance $Dt$ to the object at time t is erroneous, the object tracking section 23 corrects the distance to the object at time t on the basis of the distance to the object at time t−1 previous to time t or the distance to the object at time t+1. In the correction of the distance at time t, either the distance $Dt-1$ or the distance $Dt+1$ may be used as the distance $Dt$ at time t. Alternatively, a mean value of the distances $Dt-1$ and $Dt+1$ may be used as the distance $Dt$ to the object at time t. In a case where the calculated difference in distance is determined to be larger than the distance measurement information determination threshold value, the object tracking section 23 may invalidate or correct the result of distance measurement depending on the distance to the object at time subsequent to the determination, for example.

Note that, because the distance to the object corresponds to parallax, the distance measurement information may be invalidated or corrected according to change in parallax instead of change in distance.

According to the third embodiment as described above, in a case where the distance measurement information is determined to have a change exceeding the distance measurement information determination threshold value, according to subsequent distance measurement information, the previous distance measurement information is deleted, or the distance measurement information involving the change exceeding the distance measurement information determination threshold value is corrected. Accordingly, this makes it possible to track the object in a stable manner.

5. OTHER EMBODIMENTS

With the above-described embodiments, the distance measurement points are set in the object region detected by the object detection processing section 21 through learning, and the parallax is calculated for each of the distance measurement points by use of the stereo matching process. Alternatively, the distance measuring section 22 may set the operations of the stereo matching process according to the object indicated by the image of the object region detected by the object detection processing section 21, thereby reducing the cost of parallax calculation. Specifically, when a parallax is calculated for each distance measurement point, the distance measuring section 22 sets a search region for the stereo matching process using the result of object detection.

Figure 12:
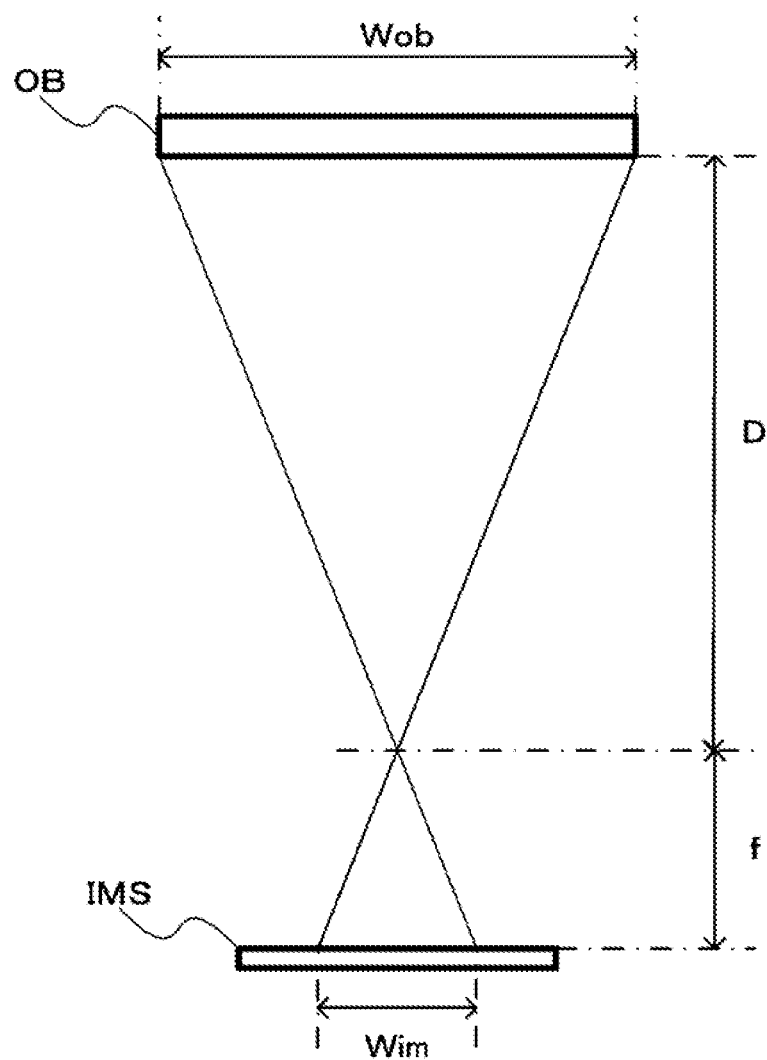
FIG. 12 is a view illustrating relations between a width of an object (object width) and a width of an object optical image (image width) on an imaging plane of an imaging element.

FIG. 12 depicts relations between the width of an object (object width) and the width of an object optical image (image width) on the imaging plane of an imaging element. Here, on the assumption that "D" stands for the distance to an object OB and "f" for the focal point distance of the imaging section, the following mathematical expression (3) defines the relations between the width Wob of the object OB (object width) and the width Wim of the object optical image (image width) on the imaging plane of an imaging element IMS:

$$Wim = f \cdot Wob/D \quad (3)$$

Also, the focal point distance f is a fixed parameter. After the image width is known, the distance D to the object is expressed as a function of the object width Wob, as defined by the following mathematical expression (4):

$$D(Wob) = f \cdot Wob/Wim \quad (4)$$

Here, in a case where the object is a person and where the height of the object is approximately 1 to 2 m and the width is approximately 0.3 to 1 m, this range covers people from children to adults. If it is assumed here that Wh_min stands for a minimum height of the range for covering persons, Wh_max for a maximum height of the range, Ww_min for a minimum width of the range, and Ww_min for a maximum width of the range, the mathematical expression (4) above may be used to calculate D(Wh_min), D(Wh_max), D(Ww_min), and D(Ww_max).

That is, according to the image width Wim of the object detected by object detection, the range of distance can be limited. Note that, in a case where the object is a person, the height varies considerably depending on whether the person is squatting or standing, for example. Also, the width varies depending on whether the person is facing front or sideways.

In view of the above, in order to prevent missed detection, a minimum distance D_min and a maximum distance D_max are set as defined by the following expressions (5) to (8):

$$D\_min = D(Wh\_min) \text{ (if } D(Wh\_min) < D(Ww\_min)) \quad (5)$$

$$D(Ww\_min) \text{ (if } D(Wh\_min) \geq D(Ww\_min)) \quad (6)$$

$$D\_max = D(Wh\_max) \text{ (if } D(Wh\_max) \geq D(Ww\_max)) \quad (7)$$

$$D(Ww\_max) \text{ (if } D(Wh\_max) < D(Ww\_max)) \quad (8)$$

The distance measuring section 22 regards the range corresponding to the distance calculated by use of the expressions (5) to (8) above as the search range for the stereo matching process, thereby reducing the cost of calculation. Also, limiting the search range makes it possible to prevent erroneous detection of parallaxes.

Further, the distance measuring section 22 may weight a matching error in the stereo matching process according to the object detected by the object detection processing section 21. For example, the distance measuring section 22 may increase the weight of the evaluation value of the range corresponding to the distance calculated by use of the expressions (5) to (8) above. In so doing, the distance measuring section 22 may calculate the parallax for the detected pixel position at which the evaluation value is highest. The evaluation value may be weighted by use of a constant or variable coefficient. Note that the variable coefficient is set in such a manner that, with presence likelihood of the height and width of the object calculated statistically, for example, the higher the presence likelihood becomes, the larger the weight is made. Performing such processing makes it easier to generate correct distance measurement information even if there occurs an error in the object width in the case where the search range is limited according to the detected object.

6. APPLICATION EXAMPLES

The technology of the present disclosure can be applied to diverse products. For example, the technology of the present disclosure may be implemented as an apparatus to be mounted on a mobile object of any kind of an electric vehicle, a hybrid electric vehicle, a motorcycle, a bicycle, a personal mobility device, an aircraft, a drone, a ship, a robot, a construction machine, and a farm machine (tractor).

Figure 13:
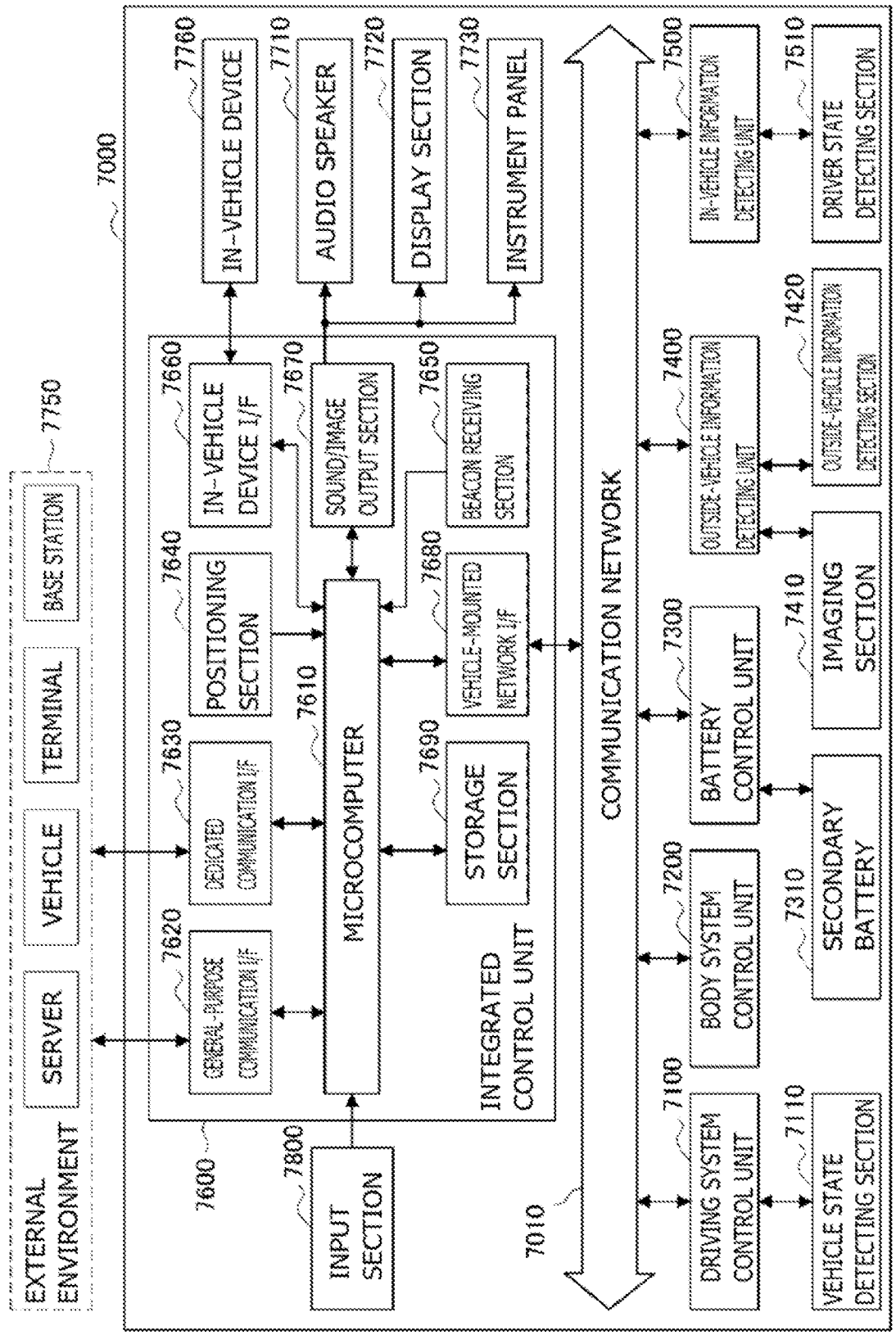
FIG. 13 is a block diagram depicting an example of schematic configuration of a vehicle control system.

FIG. 13 is a block diagram depicting an example of schematic configuration of a vehicle control system 7000 as an example of a mobile body control system to which the technology according to an embodiment of the present disclosure can be applied. The vehicle control system 7000 includes a plurality of electronic control units connected to each other via a communication network 7010. In the example depicted in FIG. 13, the vehicle control system 7000 includes a driving system control unit 7100, a body system control unit 7200, a battery control unit 7300, an outside-vehicle information detecting unit 7400, an in-vehicle information detecting unit 7500, and an integrated control unit 7600. The communication network 7010 connecting the plurality of control units to each other may, for example, be a vehicle-mounted communication network compliant with an arbitrary standard such as controller area network (CAN), local interconnect network (LIN), local area network (LAN), FlexRay (registered trademark), or the like.

Each of the control units includes: a microcomputer that performs arithmetic processing according to various kinds of programs; a storage section that stores the programs executed by the microcomputer, parameters used for various kinds of operations, or the like; and a driving circuit that drives various kinds of control target devices. Each of the control units further includes: a network interface (I/F) for performing communication with other control units via the communication network 7010; and a communication I/F for performing communication with a device, a sensor, or the like within and without the vehicle by wire communication or radio communication. A functional configuration of the integrated control unit 7600 illustrated in FIG. 13 includes a microcomputer 7610, a general-purpose communication I/F 7620, a dedicated communication I/F 7630, a positioning section 7640, a beacon receiving section 7650, an in-vehicle device I/F 7660, a sound/image output section 7670, a vehicle-mounted network I/F 7680, and a storage section 7690. The other control units similarly include a microcomputer, a communication I/F, a storage section, and the like.

The driving system control unit 7100 controls the operation of devices related to the driving system of the vehicle in accordance with various kinds of programs. For example, the driving system control unit 7100 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like. The driving system control unit 7100 may have a function as a control device of an antilock brake system (ABS), electronic stability control (ESC), or the like.

The driving system control unit 7100 is connected with a vehicle state detecting section 7110. The vehicle state detecting section 7110, for example, includes at least one of a gyro sensor that detects the angular velocity of axial rotational movement of a vehicle body, an acceleration sensor that detects the acceleration of the vehicle, and sensors for detecting an amount of operation of an accelerator pedal, an amount of operation of a brake pedal, the steering angle of a steering wheel, an engine speed or the rotational speed of wheels, and the like. The driving system control unit 7100 performs arithmetic processing using a signal input from the vehicle state detecting section 7110, and controls the internal combustion engine, the driving motor, an electric power steering device, the brake device, and the like.

The body system control unit 7200 controls the operation of various kinds of devices provided to the vehicle body in accordance with various kinds of programs. For example, the body system control unit 7200 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 7200. The body system control unit 7200 receives these input radio waves or signals, and controls a door lock device, the power window device, the lamps, or the like of the vehicle.

The battery control unit 7300 controls a secondary battery 7310, which is a power supply source for the driving motor, in accordance with various kinds of programs. For example, the battery control unit 7300 is supplied with information about a battery temperature, a battery output voltage, an amount of charge remaining in the battery, or the like from a battery device including the secondary battery 7310. The battery control unit 7300 performs arithmetic processing using these signals, and performs control for regulating the temperature of the secondary battery 7310 or controls a cooling device provided to the battery device or the like.

The outside-vehicle information detecting unit 7400 detects information about the outside of the vehicle including the vehicle control system 7000. For example, the outside-vehicle information detecting unit 7400 is connected with at least one of an imaging section 7410 and an outside-vehicle information detecting section 7420. The imaging section 7410 includes at least one of a time-of-flight (ToF) camera, a stereo camera, a monocular camera, an infrared camera, and other cameras. The outside-vehicle information detecting section 7420, for example, includes at least one of an environmental sensor for detecting current atmospheric conditions or weather conditions and a peripheral information detecting sensor for detecting another vehicle, an obstacle, a pedestrian, or the like on the periphery of the vehicle including the vehicle control system 7000.

The environmental sensor, for example, may be at least one of a rain drop sensor detecting rain, a fog sensor detecting a fog, a sunshine sensor detecting a degree of sunshine, and a snow sensor detecting a snowfall. The peripheral information detecting sensor may be at least one of an ultrasonic sensor, a radar device, and a LIDAR device (Light detection and Ranging device, or Laser imaging detection and ranging device). Each of the imaging section 7410 and the outside-vehicle information detecting section 7420 may be provided as an independent sensor or device, or may be provided as a device in which a plurality of sensors or devices are integrated.

Figure 14:
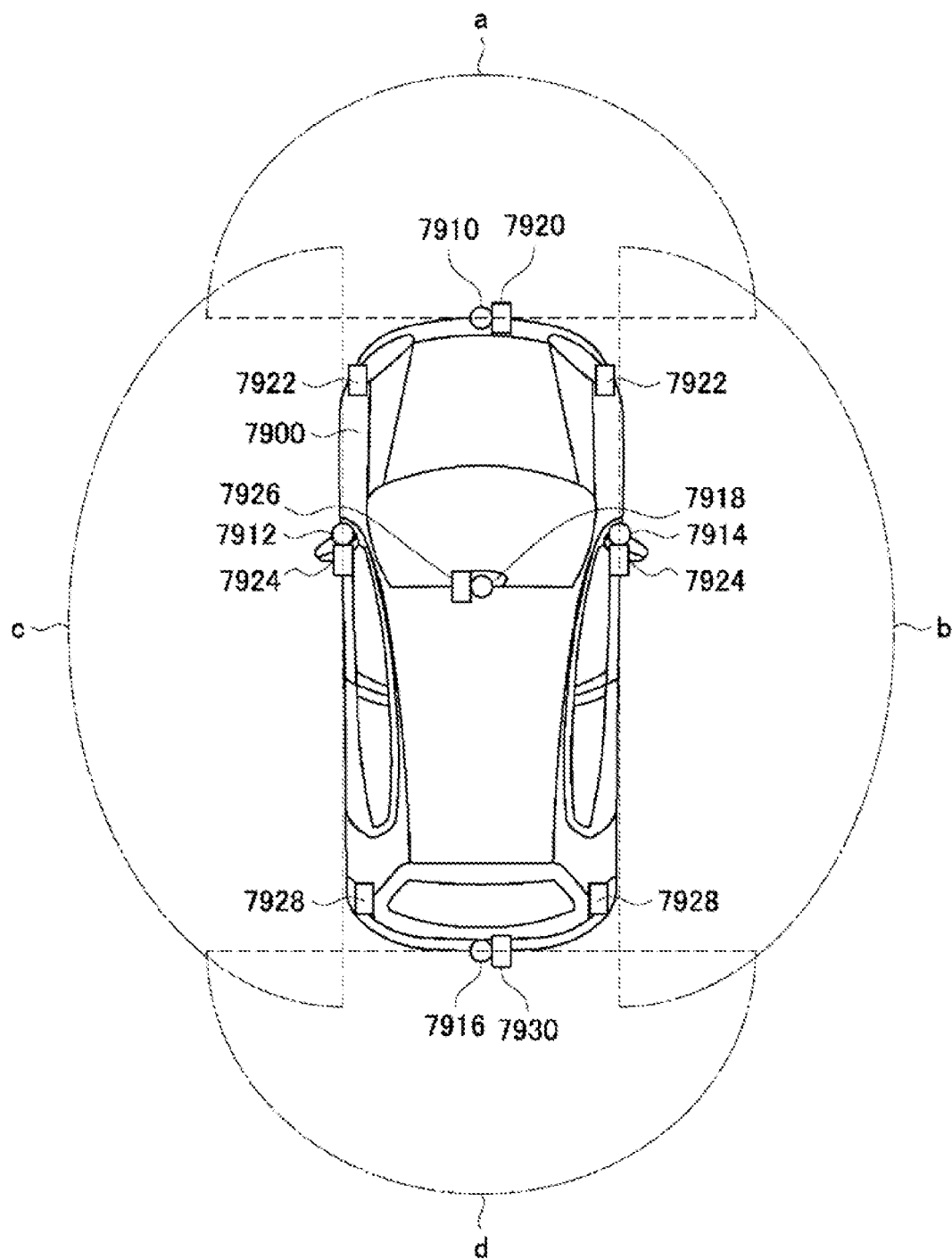
FIG. 14 is a diagram of assistance in explaining an example of installation positions of an outside-vehicle information detecting section and an imaging section.

FIG. 14 depicts an example of installation positions of the imaging section 7410 and the outside-vehicle information detecting section 7420. Imaging sections 7910, 7912, 7914, 7916, and 7918 are, for example, disposed at at least one of positions on a front nose, sideview mirrors, a rear bumper, and a back door of the vehicle 7900 and a position on an upper portion of a windshield within the interior of the vehicle. The imaging section 7910 provided to the front nose and the imaging section 7918 provided to the upper portion of the windshield within the interior of the vehicle obtain mainly an image of the front of the vehicle 7900. The imaging sections 7912 and 7914 provided to the sideview mirrors obtain mainly an image of the sides of the vehicle 7900. The imaging section 7916 provided to the rear bumper or the back door obtains mainly an image of the rear of the vehicle 7900. The imaging section 7918 provided to the upper portion of the windshield within the interior of the vehicle is used mainly to detect a preceding vehicle, a pedestrian, an obstacle, a signal, a traffic sign, a lane, or the like.

Incidentally, FIG. 14 depicts an example of photographing ranges of the respective imaging sections 7910, 7912, 7914, and 7916. An imaging range a represents the imaging range of the imaging section 7910 provided to the front nose. Imaging ranges b and c respectively represent the imaging ranges of the imaging sections 7912 and 7914 provided to the sideview mirrors. An imaging range d represents the imaging range of the imaging section 7916 provided to the rear bumper or the back door. A bird's-eye image of the vehicle 7900 as viewed from above can be obtained by superimposing image data imaged by the imaging sections 7910, 7912, 7914, and 7916, for example.

Outside-vehicle information detecting sections 7920, 7922, 7924, 7926, 7928, and 7930 provided to the front, rear, sides, and corners of the vehicle 7900 and the upper portion of the windshield within the interior of the vehicle may be, for example, an ultrasonic sensor or a radar device. The outside-vehicle information detecting sections 7920, 7926, and 7930 provided to the front nose of the vehicle 7900, the rear bumper, the back door of the vehicle 7900, and the upper portion of the windshield within the interior of the vehicle may be a LIDAR device, for example. These outside-vehicle information detecting sections 7920 to 7930 are used mainly to detect a preceding vehicle, a pedestrian, an obstacle, or the like.

Returning to FIG. 13, the description will be continued. The outside-vehicle information detecting unit 7400 makes the imaging section 7410 image an image of the outside of the vehicle, and receives imaged image data. In addition, the outside-vehicle information detecting unit 7400 receives detection information from the outside-vehicle information detecting section 7420 connected to the outside-vehicle information detecting unit 7400. In a case where the outside-vehicle information detecting section 7420 is an ultrasonic sensor, a radar device, or a LIDAR device, the outside-vehicle information detecting unit 7400 transmits an ultrasonic wave, an electromagnetic wave, or the like, and receives information of a received reflected wave. On the basis of the received information, the outside-vehicle information detecting unit 7400 may perform processing of detecting an object such as a human, a vehicle, an obstacle, a sign, a character on a road surface, or the like, or processing of detecting a distance thereto. The outside-vehicle information detecting unit 7400 may perform environment recognition processing of recognizing a rainfall, a fog, road surface conditions, or the like on the basis of the received information. The outside-vehicle information detecting unit 7400 may calculate a distance to an object outside the vehicle on the basis of the received information.

In addition, on the basis of the received image data, the outside-vehicle information detecting unit 7400 may perform image recognition processing of recognizing a human, a vehicle, an obstacle, a sign, a character on a road surface, or the like, or processing of detecting a distance thereto. The outside-vehicle information detecting unit 7400 may subject the received image data to processing such as distortion correction, alignment, or the like, and combine the image data imaged by a plurality of different imaging sections 7410 to generate a bird's-eye image or a panoramic image. The outside-vehicle information detecting unit 7400 may perform viewpoint conversion processing using the image data imaged by the imaging section 7410 including the different imaging parts.

The in-vehicle information detecting unit 7500 detects information about the inside of the vehicle. The in-vehicle information detecting unit 7500 is, for example, connected with a driver state detecting section 7510 that detects the state of a driver. The driver state detecting section 7510 may include a camera that images the driver, a biosensor that detects biological information of the driver, a microphone that collects sound within the interior of the vehicle, or the like. The biosensor is, for example, disposed in a seat surface, the steering wheel, or the like, and detects biological information of an occupant sitting in a seat or the driver holding the steering wheel. On the basis of detection information input from the driver state detecting section 7510, the in-vehicle information detecting unit 7500 may calculate a degree of fatigue of the driver or a degree of concentration of the driver, or may determine whether the driver is dozing. The in-vehicle information detecting unit 7500 may subject an audio signal obtained by the collection of the sound to processing such as noise canceling processing or the like.

The integrated control unit 7600 controls general operation within the vehicle control system 7000 in accordance with various kinds of programs. The integrated control unit 7600 is connected with an input section 7800. The input section 7800 is implemented by a device capable of input operation by an occupant, such, for example, as a touch panel, a button, a microphone, a switch, a lever, or the like.

The integrated control unit 7600 may be supplied with data obtained by voice recognition of voice input through the microphone. The input section 7800 may, for example, be a remote control device using infrared rays or other radio waves, or an external connecting device such as a mobile telephone, a personal digital assistant (PDA), or the like that supports operation of the vehicle control system 7000. The input section 7800 may be, for example, a camera. In that case, an occupant can input information by gesture. Alternatively, data may be input which is obtained by detecting the movement of a wearable device that an occupant wears. Further, the input section 7800 may, for example, include an input control circuit or the like that generates an input signal on the basis of information input by an occupant or the like using the above-described input section 7800, and which outputs the generated input signal to the integrated control unit 7600. An occupant or the like inputs various kinds of data or gives an instruction for processing operation to the vehicle control system 7000 by operating the input section 7800.

The storage section 7690 may include a read only memory (ROM) that stores various kinds of programs executed by the microcomputer and a random access memory (RAM) that stores various kinds of parameters, operation results, sensor values, or the like. In addition, the storage section 7690 may be implemented by a magnetic storage device such as a hard disc drive (HDD) or the like, a semiconductor storage device, an optical storage device, a magneto-optical storage device, or the like.

The general-purpose communication I/F 7620 is a communication I/F used widely, which communication I/F mediates communication with various apparatuses present in an external environment 7750. The general-purpose communication I/F 7620 may implement a cellular communication protocol such as global system for mobile communications (GSM (registered trademark)), worldwide interoperability for microwave access (WiMAX (registered trademark)), long term evolution (LTE (registered trademark)), LTE-advanced (LTE-A), or the like, or another wireless communication protocol such as wireless LAN (referred to also as wireless fidelity (Wi-Fi (registered trademark)), Bluetooth (registered trademark), or the like. The general-purpose communication I/F 7620 may, for example, connect to an apparatus (for example, an application server or a control server) present on an external network (for example, the Internet, a cloud network, or a company-specific network) via a base station or an access point. In addition, the general-purpose communication I/F 7620 may connect to a terminal present in the vicinity of the vehicle (which terminal is, for example, a terminal of the driver, a pedestrian, or a store, or a machine type communication (MTC) terminal) using a peer to peer (P2P) technology, for example.

The dedicated communication I/F 7630 is a communication I/F that supports a communication protocol developed for use in vehicles. The dedicated communication I/F 7630 may implement a standard protocol such, for example, as wireless access in vehicle environment (WAVE), which is a combination of institute of electrical and electronic engineers (IEEE) 802.11p as a lower layer and IEEE 1609 as a higher layer, dedicated short range communications (DSRC), or a cellular communication protocol. The dedicated communication I/F 7630 typically carries out V2X communication as a concept including one or more of communication between a vehicle and a vehicle (Vehicle to Vehicle), communication between a road and a vehicle (Vehicle to Infrastructure), communication between a vehicle and a home (Vehicle to Home), and communication between a pedestrian and a vehicle (Vehicle to Pedestrian).

The positioning section 7640, for example, performs positioning by receiving a global navigation satellite system (GNSS) signal from a GNSS satellite (for example, a GPS signal from a global positioning system (GPS) satellite), and generates positional information including the latitude, longitude, and altitude of the vehicle. Incidentally, the positioning section 7640 may identify a current position by exchanging signals with a wireless access point, or may obtain the positional information from a terminal such as a mobile telephone, a personal handyphone system (PHS), or a smart phone that has a positioning function.

The beacon receiving section 7650, for example, receives a radio wave or an electromagnetic wave transmitted from a radio station installed on a road or the like, and thereby obtains information about the current position, congestion, a closed road, a necessary time, or the like. Incidentally, the function of the beacon receiving section 7650 may be included in the dedicated communication I/F 7630 described above.

The in-vehicle device I/F 7660 is a communication interface that mediates connection between the microcomputer 7610 and various in-vehicle devices 7760 present within the vehicle. The in-vehicle device I/F 7660 may establish wireless connection using a wireless communication protocol such as wireless LAN, Bluetooth (registered trademark), near field communication (NFC), or wireless universal serial bus (WUSB). In addition, the in-vehicle device I/F 7660 may establish wired connection by universal serial bus (USB), high-definition multimedia interface (HDMI (registered trademark)), mobile high-definition link (MHL), or the like via a connection terminal (and a cable if necessary) not depicted in the figures. The in-vehicle devices 7760 may, for example, include at least one of a mobile device and a wearable device possessed by an occupant and an information device carried into or attached to the vehicle. The in-vehicle devices 7760 may also include a navigation device that searches for a path to an arbitrary destination. The in-vehicle device I/F 7660 exchanges control signals or data signals with these in-vehicle devices 7760.

The vehicle-mounted network I/F 7680 is an interface that mediates communication between the microcomputer 7610 and the communication network 7010. The vehicle-mounted network I/F 7680 transmits and receives signals or the like in conformity with a predetermined protocol supported by the communication network 7010.

The microcomputer 7610 of the integrated control unit 7600 controls the vehicle control system 7000 in accordance with various kinds of programs on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. For example, the microcomputer 7610 may calculate a control target value for the driving force generating device, the steering mechanism, or the braking device on the basis of the obtained information about the inside and outside of the vehicle, and output a control command to the driving system control unit 7100. For example, the microcomputer 7610 may perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like. In addition, the microcomputer 7610 may perform cooperative control intended for automatic driving, which makes the vehicle to travel autonomously without depending on the operation of the driver, or the like, by controlling the driving force generating device, the steering mechanism, the braking device, or the like on the basis of the obtained information about the surroundings of the vehicle.

The microcomputer 7610 may generate three-dimensional distance information between the vehicle and an object such as a surrounding structure, a person, or the like, and generate local map information including information about the surroundings of the current position of the vehicle, on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. In addition, the microcomputer 7610 may predict danger such as collision of the vehicle, approaching of a pedestrian or the like, an entry to a closed road, or the like on the basis of the obtained information, and generate a warning signal. The warning signal may, for example, be a signal for producing a warning sound or lighting a warning lamp.

The sound/image output section 7670 transmits an output signal of at least one of a sound and an image to an output device capable of visually or auditorily notifying information to an occupant of the vehicle or the outside of the vehicle. In the example of FIG. 13, an audio speaker 7710, a display section 7720, and an instrument panel 7730 are illustrated as the output device. The display section 7720 may, for example, include at least one of an on-board display and a head-up display. The display section 7720 may have an augmented reality (AR) display function. The output device may be other than these devices, and may be another device such as headphones, a wearable device such as an eyeglass type display worn by an occupant or the like, a projector, a lamp, or the like. In a case where the output device is a display device, the display device visually displays results obtained by various kinds of processing performed by the microcomputer 7610 or information received from another control unit in various forms such as text, an image, a table, a graph, or the like. In addition, in a case where the output device is an audio output device, the audio output device converts an audio signal constituted of reproduced audio data or sound data or the like into an analog signal, and auditorily outputs the analog signal.

Incidentally, at least two control units connected to each other via the communication network 7010 in the example depicted in FIG. 13 may be integrated into one control unit. Alternatively, each individual control unit may include a plurality of control units. Further, the vehicle control system 7000 may include another control unit not depicted in the figures. In addition, part or the whole of the functions performed by one of the control units in the above description may be assigned to another control unit. That is, predetermined arithmetic processing may be performed by any of the control units as long as information is transmitted and received via the communication network 7010. Similarly, a sensor or a device connected to one of the control units may be connected to another control unit, and a plurality of control units may mutually transmit and receive detection information via the communication network 7010.

In the above-described vehicle control system 7000, the information processing apparatus of the present embodiment can be applied to the outside-vehicle information detecting unit 7400 depicted as an application example in FIG. 13. For example, the imaging section 7410 is configured to acquire multiple viewpoint images with different viewpoint positions such as stereo images. The outside-vehicle information detecting unit 7400 detects the object region on the basis of the multiple viewpoint images acquired by the imaging section 7410 and generates the distance information regarding the object indicated by the image of the detected object region. Also, the outside-vehicle information detecting unit 7400 tracks the object on the basis of the distance information and the result of object detection. The outside-vehicle information detecting unit 7400 outputs the generated distance information and the result of object tracking to the microcomputer 7600. Thus, on the basis of the distance information and the result of object tracking from the outside-vehicle information detecting unit 7400, the microcomputer 7610 can perform control to stably avoid contact or collision between the object and the vehicle.

The series of processes described in this specification can be executed by hardware, by software, or by a combination of both. In a case where the software-based processing is to be carried out, the programs recording the process sequences is installed into an internal memory of a computer built with dedicated hardware for program execution. Alternatively, the programs can be installed into a general-purpose computer capable of performing diverse processes for execution of the programs.

For example, the programs can be recorded beforehand on a hard disk, an SSD (Solid State Drive) or a ROM (Read Only Memory) serving as a recording medium. Alternatively, the programs can be stored (recorded) temporarily or permanently on a removable recording medium such as a flexible disk, a CD-ROM (Compact Disc Read Only Memory), an MO (Magneto optical) disc, a DVD (Digital Versatile Disc), a BD (Blu-Ray Disc (registered trademark)), a magnetic disk, or a semiconductor memory card. Such removable recording media can be offered as so-called packaged software.

Besides, being installed into the computer from the removable recording media, the programs may also be transferred from a download site to the computer via networks such as a LAN (Local Area Network) or the Internet in a wireless or wired manner. The computer can receive the programs transferred in such a manner and have them installed onto an internal recording medium such as a hard disk.

Note that the advantageous effects described in the present specification are only examples and are not limitative of the present technology. There may also be additional advantageous effects which are not described in the present specification. Also, the present technology should not be interpreted as being limited to the embodiments of the present technology described above. The embodiments of the present technology are presented only as illustrations in disclosing the present technology. It is obvious that many alternatives and modifications of the embodiments can be achieved to those skilled in the art without departing from the gist of the present technology. Accordingly, the gist of the present technology should be determined in consideration of the appended claims.

In addition, the information processing apparatus according to the present technology may also be implemented preferably in the following configurations:

(1) An information processing apparatus including:
an object detection processing section configured to detect an object region, using at least one of a plurality of viewpoint images with different viewpoint positions; and
a distance measuring section configured to set a plurality of distance measurement points in the object region detected by the object detection processing section, and generate distance measurement information regarding an object indicated by an image of the object region on the basis of a parallax calculated for each of the plurality of distance measurement points using the plurality of viewpoint images.

(2) The information processing apparatus as stated in paragraph (1) above, in which
the distance measuring section sets a distance measurement point arrangement region in the object region detected by the object detection processing section, and sets the plurality of distance measurement points in the distance measurement point arrangement region.

(3) The information processing apparatus as stated in paragraph (2) above, in which
the distance measuring section performs ellipse fitting on the object region to set the distance measurement point arrangement region.

(4) The information processing apparatus as stated in paragraph (2) above, in which
the distance measuring section sets the plurality of distance measurement points in a predetermined distribution state in the distance measurement point arrangement region.

(5) The information processing apparatus as stated in any one of paragraphs (1) to (4) above, in which
the distance measuring section selects the distance measurement points corresponding to the object from a statistical distribution of the parallax calculated for each of the distance measurement points, and generates the distance measurement information regarding the object on the basis of the parallax for each of the selected distance measurement points.

(6) The information processing apparatus as stated in paragraph (5) above, in which
the distance measuring section turns into a histogram the parallax calculated for each of the distance measurement points, and selects, as the distance measurement points corresponding to the object, the distance measurement points indicating the parallax of a bin with the highest frequency or the parallax of bins in a predetermined range in reference to the highest-frequency bin.

(7) The information processing apparatus as stated in paragraph (5) or (6) above, in which
the distance measuring section calculates the parallax with sub-pixel accuracy for each of the selected distance measurement points, and generates the distance measurement information, using, as the parallax of the object, a statistical value based on the parallax calculated for each of the distance measurement points.

(8) The information processing apparatus as stated in paragraph (7) above, in which
the distance measuring section calculates the parallax with sub-pixel accuracy on the basis of a pixel-accuracy matching error obtained from a stereo matching process performed on each of the selected distance measurement points.

(9) The information processing apparatus as stated in any one of paragraphs (1) to (8) above, in which
the distance measuring section sets operations of a stereo matching process according to the object indicated by the image of the object region detected by the object detection processing section, and calculates the parallax for each of the distance measurement points through the stereo matching process.

(10) The information processing apparatus as stated in paragraph (9) above, in which the distance measuring section sets a search range for the stereo matching process according to the object detected by the object detection processing section.

(11) The information processing apparatus as stated in paragraph (9) or (10) above, in which the distance measuring section weights a matching error in the stereo matching process according to the object detected by the object detection processing section.

(12) The information processing apparatus as stated in any one of paragraphs (1) to (11) above, in which the object detection processing section detects the object region, using information learned through prior learning.

(13) The information processing apparatus as stated in any one of paragraphs (1) to (12) above, further including:

an object tracking section configured to track the object on the basis of the distance measurement information generated by the distance measuring section and a result of the object region detection performed by the object detection processing section.

(14) The information processing apparatus as stated in paragraph (13) above, in which in a case where the object is tracked, the distance measuring section selects, from a statistical distribution of the parallax calculated for each of the distance measurement points, the parallaxes approximating those for the previously selected distance measurement points corresponding to the object, and generates the distance measurement information regarding the object on the basis of the parallax for each of the selected distance measurement points.

(15) The information processing apparatus as stated in paragraph (13) or (14) above, in which the object tracking section processes the distance measurement information used for tracking the object in keeping with a change over time in the distance measurement information.

(16) The information processing apparatus as stated in any one of paragraphs (13) to (15) above, in which in a case where a change in the distance measurement information is larger than a predetermined distance measurement information determination threshold value and where a difference between the distance measurement information involving the change larger than the distance measurement information determination threshold value and the distance measurement information subsequent thereto is equal to or smaller than the distance measurement information determination threshold value, the object tracking section tracks the object by invalidating the distance measurement information previous to the change larger than the distance measurement information determination threshold value.

(17) The information processing apparatus as stated in any one of paragraphs (13) to (16) above, in which in a case where a change in the distance measurement information is larger than a predetermined distance measurement information determination threshold value and where a difference between the distance measurement information subsequent to the change larger than the distance measurement information determination threshold value and the distance measurement information previous to the change larger than the distance measurement information determination threshold value is equal to or smaller than the distance measurement information determination threshold value, the object tracking section corrects the distance measurement information involving the change larger than the distance measurement information determination threshold value on the basis of the distance measurement information previous to the change larger than the distance measurement information determination threshold value or the distance measurement information subsequent to the change larger than the distance measurement information determination threshold value.

INDUSTRIAL APPLICABILITY

According to the information processing apparatus, information processing method, and program according to the present technology, an object region is detected by use of at least one of multiple viewpoint images with different viewpoint positions. Multiple distance measurement points are set in the detected object region. On the basis of a parallax calculated for each of the distance measurement points by use of the multiple viewpoint images, distance measurement information is generated regarding an object indicated by an image of the object region. This makes it possible to generate the distance measurement information regarding the object without increasing a baseline length to such an extent that the object and the background can be distinguished from each other, the baseline length being between imaging sections for acquiring the multiple viewpoint images with different viewpoint positions. The technology is applied advantageously to mobile devices and the like that need information regarding the distance to an object.

REFERENCE SIGNS LIST

10: Information processing system
11L, 11R: Imaging section
15L, 15R: Distortion correcting section
20, 20a: Information processing apparatus
21: Object detection processing section
22: Distance measuring section
23: Object tracking section

The invention claimed is:

1. An information processing apparatus, comprising:
   a central processing unit (CPU):
     detect an object region, using at least one of a plurality of viewpoint images with different viewpoint positions;
     set a plurality of distance measurement points in the detected object region;
     generate distance measurement information regarding an object indicated by an image of the object region, wherein the distance measurement information is generated based on a parallax calculated for each of the plurality of distance measurement points using the plurality of viewpoint images; and
     track the object based on the generated distance measurement information and a result of the detection of the object region.

2. The information processing apparatus according to claim 1, wherein the CPU is further configured to:
   set a distance measurement point arrangement region in the detected object region; and
   set the plurality of distance measurement points in the distance measurement point arrangement region.

3. The information processing apparatus according to claim 2, wherein the CPU is further configured to perform ellipse fitting on the object region to set the distance measurement point arrangement region.

4. The information processing apparatus according to claim 2, wherein the CPU is further configured to set the plurality of distance measurement points in a specific distribution state in the distance measurement point arrangement region.

5. The information processing apparatus according to claim 1, wherein the CPU is further configured to:
  select the distance measurement points corresponding to the object from a statistical distribution of the parallax calculated for each of the distance measurement points; and
  generate the distance measurement information regarding the object based on the parallax for each of the selected distance measurement points.

6. The information processing apparatus according to claim 5, wherein the CPU is further configured to:
  turn into a histogram the parallax calculated for each of the distance measurement points; and
  select, as the distance measurement points corresponding to the object, the distance measurement points that indicates the parallax of a bin with a highest frequency or the parallax of bins in a specific range in reference to the highest-frequency bin.

7. The information processing apparatus according to claim 5, wherein the CPU is further configured to:
  calculate the parallax with sub-pixel accuracy for each of the selected distance measurement points; and
  generate the distance measurement information, using, as the parallax of the object, a statistical value based on the parallax calculated for each of the distance measurement points.

8. The information processing apparatus according to claim 7, wherein the CPU is further configured to calculate the parallax with sub-pixel accuracy based on a pixel-accuracy matching error obtained from a stereo matching process performed on each of the selected distance measurement points.

9. The information processing apparatus according to claim 1, wherein the CPU is further configured to:
  set operations of a stereo matching process based on the object indicated by the image of the detected object region; and
  calculate the parallax for each of the distance measurement points through the stereo matching process.

10. The information processing apparatus according to claim 9, CPU is further configured to set a search range for the stereo matching process based on the detected object.

11. The information processing apparatus according to claim 9, wherein the CPU is further configured to weight a matching error in the stereo matching process based on the detected object.

12. The information processing apparatus according to claim 1, wherein the CPU is further configured to detect the object region based on information learned through prior learning.

13. The information processing apparatus according to claim 1, wherein in a case where the object is tracked, the CPU is further configured to:
  select, from a statistical distribution of the parallax calculated for each of the distance measurement points, the parallaxes that approximate those for the previously selected distance measurement points corresponding to the object; and
  generate the distance measurement information regarding the object based on the parallax for each of the selected distance measurement points.

14. The information processing apparatus according to claim 1, wherein the CPU is further configured to process the distance measurement information used to track the object in keeping with a change over time in the distance measurement information.

15. The information processing apparatus according to claim 1, wherein
  based on a change in the distance measurement information is larger than a specific distance measurement information determination threshold value and where a difference between the distance measurement information involving the change larger than the distance measurement information determination threshold value and the distance measurement information subsequent thereto is equal to or smaller than the distance measurement information determination threshold value, the CPU is further configured to track the object by invalidation of the distance measurement information previous to the change larger than the distance measurement information determination threshold value.

16. The information processing apparatus according to claim 1, wherein
  based on a change in the distance measurement information is larger than a specific distance measurement information determination threshold value and where a difference between the distance measurement information subsequent to the change larger than the distance measurement information determination threshold value and the distance measurement information previous to the change larger than the distance measurement information determination threshold value is equal to or smaller than the distance measurement information determination threshold value, the CPU is further configured to correct the distance measurement information involving the change larger than the distance measurement information determination threshold value on a basis of the distance measurement information previous to the change larger than the distance measurement information determination threshold value or the distance measurement information subsequent to the change larger than the distance measurement information determination threshold value.

17. An information processing method, comprising:
  detecting, by an object detection processing section, an object region, using at least one of a plurality of viewpoint images with different viewpoint positions;
  setting a plurality of distance measurement points in the detected object region;
  generating distance measurement information regarding an object indicated by an image of the object region, wherein the distance measurement information is generated based on a parallax calculated for each of the plurality of distance measurement points, using the plurality of viewpoint images; and
  tracking the object based on the generated distance measurement information and a result of the detection of the object region.

18. A non-transitory computer-readable medium having stored thereon, computer-executable instructions that when executed by a computer, causes the system to execute information processing using a plurality of viewpoint images with different viewpoint positions to:
  detect an object region using at least one of the plurality of viewpoint images;
  set a plurality of distance measurement points in the detected object region;

generate distance measurement information regarding an object indicated by an image of the object region, wherein the distance measurement information is generated based on a parallax calculated for each of the plurality of distance measurement points, using the plurality of viewpoint images; and track the object based on the generated distance measurement information and a result of the detection of the object region.

* * * * *